United States Patent
Parker

(10) Patent No.: US 9,523,902 B2
(45) Date of Patent: Dec. 20, 2016

(54) MITIGATING THERMAL SHOCK IN TINTABLE WINDOWS

(71) Applicant: Ronald M. Parker, Olive Branch, MS (US)

(72) Inventor: Ronald M. Parker, Olive Branch, MS (US)

(73) Assignee: View, Inc., Milpitas, CA (US)

( * ) Notice: Subject to any disclaimer, the term of this patent is extended or adjusted under 35 U.S.C. 154(b) by 106 days.

(21) Appl. No.: 14/352,973

(22) PCT Filed: Oct. 19, 2012

(86) PCT No.: PCT/US2012/061137
§ 371 (c)(1),
(2) Date: Apr. 18, 2014

(87) PCT Pub. No.: WO2013/059674
PCT Pub. Date: Apr. 25, 2013

(65) Prior Publication Data
US 2014/0300945 A1    Oct. 9, 2014

Related U.S. Application Data

(60) Provisional application No. 61/550,277, filed on Oct. 21, 2011.

(51) Int. Cl.
*G02F 1/153*        (2006.01)
*G02F 1/163*        (2006.01)
(Continued)

(52) U.S. Cl.
CPC ............. *G02F 1/163* (2013.01); *E06B 3/6722* (2013.01); *E06B 7/28* (2013.01); *E06B 9/24* (2013.01);
(Continued)

(58) Field of Classification Search
CPC ............. E06B 9/24; E06B 3/6715; E06B 3/66
(Continued)

(56) References Cited

U.S. PATENT DOCUMENTS 5,124,833 A    6/1992  Barton et al.
5,170,108 A   12/1992  Peterson et al.
(Continued)

FOREIGN PATENT DOCUMENTS

CN    2590732 Y    12/2003
CN   101969207 A    2/2011
(Continued)

OTHER PUBLICATIONS

U.S. Appl. No. 14/468,778, filed Aug. 26, 2014.
(Continued)

*Primary Examiner* — Tuyen Tra
(74) *Attorney, Agent, or Firm* — Weaver Austin Villeneuve & Sampson LLP; Brian D. Griedel

(57) ABSTRACT

Tintable optical components such as windows are provided with a controller designed or configured to control the tinting in a manner that resists exposure to damaging thermal shock. The controller determines that a trigger condition for thermal shock is occurring or is about to occur and takes steps to avoid damaging thermal shock. In some cases, these steps include increasing the transmissivity of the optical component or holding the component in a highly transmissive state. In some cases, the steps involve heating the component.

19 Claims, 11 Drawing Sheets

(51) Int. Cl.
  *E06B 9/24* (2006.01)
  *E06B 7/28* (2006.01)
  *E06B 3/66* (2006.01)
  *E06B 3/67* (2006.01)

(52) U.S. Cl.
  CPC ............... *E06B 3/66* (2013.01); *E06B 3/6715* (2013.01); *E06B 2009/2464* (2013.01)

(58) Field of Classification Search
  USPC .................................. 359/265–275; 345/105
  See application file for complete search history.

(56) References Cited

U.S. PATENT DOCUMENTS

| | | |
|---|---|---|
| 5,204,778 A | 4/1993 | Bechtel |
| 5,220,317 A | 6/1993 | Lynam et al. |
| 5,290,986 A | 3/1994 | Colon et al. |
| 5,353,148 A | 10/1994 | Eid et al. |
| 5,365,365 A | 11/1994 | Ripoche et al. |
| 5,379,146 A | 1/1995 | Defendini |
| 5,384,578 A | 1/1995 | Lynam et al. |
| 5,402,144 A | 3/1995 | Ripoche |
| 5,451,822 A | 9/1995 | Bechtel et al. |
| 5,598,000 A | 1/1997 | Popat |
| 5,621,526 A | 4/1997 | Kuze |
| 5,673,028 A | 9/1997 | Levy |
| 5,694,144 A | 12/1997 | Lefrou et al. |
| 5,764,402 A | 6/1998 | Thomas et al. |
| 5,822,107 A | 10/1998 | Lefrou et al. |
| 5,900,720 A | 5/1999 | Kallman et al. |
| 5,956,012 A | 9/1999 | Turnbull et al. |
| 5,973,818 A | 10/1999 | Sjursen et al. |
| 5,973,819 A | 10/1999 | Pletcher et al. |
| 5,978,126 A | 11/1999 | Sjursen |
| 6,039,850 A | 3/2000 | Schulz et al. |
| 6,055,089 A | 4/2000 | Schulz et al. |
| 6,084,700 A | 7/2000 | Knapp et al. |
| 6,130,448 A | 10/2000 | Bauer et al. |
| 6,130,772 A | 10/2000 | Cava |
| 6,222,177 B1 | 4/2001 | Bechtel et al. |
| 6,262,831 B1 | 7/2001 | Bauer et al. |
| 6,386,713 B1 | 5/2002 | Turnbull et al. |
| 6,407,468 B1 | 6/2002 | LeVesque et al. |
| 6,407,847 B1 | 6/2002 | Poll et al. |
| 6,449,082 B1 | 9/2002 | Agrawal et al. |
| 6,471,360 B2 | 10/2002 | Rukavina et al. |
| 6,535,126 B2 | 3/2003 | Lin et al. |
| 6,567,708 B1 | 5/2003 | Bechtel et al. |
| 6,614,577 B1 | 9/2003 | Yu et al. |
| 6,795,226 B2 | 9/2004 | Agrawal et al. |
| 6,829,511 B2 | 12/2004 | Bechtel et al. |
| 6,856,444 B2 | 2/2005 | Ingalls et al. |
| 6,897,936 B1 | 5/2005 | Li et al. |
| 6,940,627 B2 | 9/2005 | Freeman et al. |
| 7,085,609 B2 | 8/2006 | Bechtel et al. |
| 7,133,181 B2 | 11/2006 | Greer |
| 7,215,318 B2 | 5/2007 | Turnbull et al. |
| 7,277,215 B2 | 10/2007 | Greer |
| 7,304,787 B2 | 12/2007 | Whitesides et al. |
| 7,417,397 B2 | 8/2008 | Berman et al. |
| 7,542,809 B2 | 6/2009 | Bechtel et al. |
| 7,548,833 B2 | 6/2009 | Ahmed |
| 7,567,183 B2 | 7/2009 | Schwenke |
| 7,610,910 B2 | 11/2009 | Ahmed |
| 7,763,334 B2 | 7/2010 | Berkowitz |
| 7,817,326 B1 | 10/2010 | Rennig et al. |
| 7,822,490 B2 | 10/2010 | Bechtel et al. |
| 7,873,490 B2 | 1/2011 | MacDonald |
| 7,941,245 B1 | 5/2011 | Popat |
| 7,941,982 B2 | 5/2011 | Merica |
| 7,972,021 B2 | 7/2011 | Scherer |
| 7,990,603 B2 | 8/2011 | Ash et al. |
| 8,004,739 B2 | 8/2011 | Letocart |
| 8,018,644 B2 | 9/2011 | Gustavsson et al. |
| 8,102,586 B2 | 1/2012 | Albahri |
| 8,213,074 B1 | 7/2012 | Shrivastava et al. |
| 8,254,013 B2 | 8/2012 | Mehtani et al. |
| 8,292,228 B2 | 10/2012 | Mitchell et al. |
| 8,456,729 B2 | 6/2013 | Brown et al. |
| 8,547,624 B2 | 10/2013 | Ash et al. |
| 8,705,162 B2 | 4/2014 | Brown et al. |
| 8,723,467 B2 | 5/2014 | Berman et al. |
| 8,800,221 B1 | 8/2014 | Header |
| 8,836,263 B2 | 9/2014 | Berman et al. |
| 8,864,321 B2 | 10/2014 | Mehtani et al. |
| 8,902,486 B1 | 12/2014 | Chandrasekhar |
| 8,976,440 B2 | 3/2015 | Berland et al. |
| 9,030,725 B2 | 5/2015 | Pradhan et al. |
| 9,081,247 B1 | 7/2015 | Pradhan et al. |
| 2002/0075472 A1 | 6/2002 | Holton |
| 2002/0152298 A1 | 10/2002 | Kikta et al. |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0135989 A1 | 7/2004 | Klebe |
| 2004/0160322 A1 | 8/2004 | Stilp |
| 2005/0200934 A1 | 9/2005 | Callahan et al. |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0278047 A1 | 12/2005 | Ahmed |
| 2006/0018000 A1 | 1/2006 | Greer |
| 2006/0107616 A1 | 5/2006 | Ratti et al. |
| 2006/0170376 A1 | 8/2006 | Piepgras et al. |
| 2006/0187608 A1 | 8/2006 | Stark |
| 2006/0209007 A1 | 9/2006 | Pyo et al. |
| 2006/0245024 A1 | 11/2006 | Greer |
| 2007/0002007 A1 | 1/2007 | Tam |
| 2007/0067048 A1 | 3/2007 | Bechtel et al. |
| 2007/0162233 A1 | 7/2007 | Schwenke |
| 2007/0285759 A1 | 12/2007 | Ash et al. |
| 2008/0018979 A1 | 1/2008 | Mahe et al. |
| 2009/0027759 A1 | 1/2009 | Albahri |
| 2009/0066157 A1 | 3/2009 | Tarng et al. |
| 2009/0143141 A1 | 6/2009 | Wells et al. |
| 2009/0243732 A1 | 10/2009 | Tarng et al. |
| 2009/0243802 A1 | 10/2009 | Wolf et al. |
| 2010/0039410 A1 | 2/2010 | Becker et al. |
| 2010/0066484 A1 | 3/2010 | Hanwright et al. |
| 2010/0082081 A1 | 4/2010 | Niessen et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0208326 A1 | 8/2010 | Kwak et al. |
| 2010/0235206 A1 | 9/2010 | Miller et al. |
| 2010/0243427 A1 | 9/2010 | Kozlowski et al. |
| 2010/0245972 A1 | 9/2010 | Wright |
| 2010/0315693 A1 | 12/2010 | Lam et al. |
| 2011/0026091 A1 | 2/2011 | Brown et al. |
| 2011/0038030 A1 | 2/2011 | Roosendaal et al. |
| 2011/0046810 A1 | 2/2011 | Bechtel et al. |
| 2011/0063708 A1 | 3/2011 | Letocart |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0167741 A1 | 7/2011 | Surace et al. |
| 2011/0235152 A1 | 9/2011 | Letocart |
| 2011/0249313 A1 | 10/2011 | Letocart |
| 2011/0255142 A1 | 10/2011 | Ash et al. |
| 2011/0266419 A1 | 11/2011 | Jones et al. |
| 2011/0292488 A1 | 12/2011 | McCarthy et al. |
| 2011/0304898 A1 | 12/2011 | Letocart |
| 2012/0026573 A1 | 2/2012 | Collins et al. |
| 2012/0062975 A1 | 3/2012 | Mehtani et al. |
| 2012/0133315 A1 | 5/2012 | Berman et al. |
| 2012/0190386 A1 | 7/2012 | Anderson |
| 2012/0194895 A1 | 8/2012 | Podbelski et al. |
| 2012/0200908 A1 | 8/2012 | Bergh et al. |
| 2012/0236386 A1 | 9/2012 | Mehtani et al. |
| 2012/0239209 A1 | 9/2012 | Brown et al. |
| 2012/0268803 A1 | 10/2012 | Greer |

(56) References Cited

U.S. PATENT DOCUMENTS

| | | |
|---|---|---|
| 2012/0293855 A1 | 11/2012 | Shrivastava et al. |
| 2013/0057937 A1 | 3/2013 | Berman et al. |
| 2013/0158790 A1 | 6/2013 | McIntyre, Jr. et al. |
| 2013/0242370 A1 | 9/2013 | Wang |
| 2013/0263510 A1 | 10/2013 | Gassion |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0278989 A1 | 10/2013 | Lam et al. |
| 2014/0067733 A1 | 3/2014 | Humann |
| 2014/0160550 A1 | 6/2014 | Brown et al. |
| 2014/0236323 A1 | 8/2014 | Brown et al. |
| 2014/0247475 A1 | 9/2014 | Parker et al. |
| 2014/0259931 A1 | 9/2014 | Plummer |
| 2014/0268287 A1 | 9/2014 | Brown et al. |
| 2014/0330538 A1 | 11/2014 | Conklin et al. |
| 2014/0371931 A1 | 12/2014 | Lin et al. |
| 2015/0002919 A1 | 1/2015 | Jack et al. |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0077832 A1 | 3/2015 | Berland et al. |
| 2015/0116811 A1 | 4/2015 | Shrivastava et al. |
| 2015/0122474 A1 | 5/2015 | Peterson |

FOREIGN PATENT DOCUMENTS

| | | |
|---|---|---|
| CN | 102203370 A | 9/2011 |
| DE | 10124673 A1 | 11/2002 |
| EP | 0445314 | 9/1991 |
| EP | 0869032 | 10/1998 |
| EP | 0835475 B1 | 9/2004 |
| EP | 1510854 A1 | 3/2005 |
| EP | 1417535 | 11/2005 |
| EP | 1619546 A2 | 1/2006 |
| EP | 0920210 | 6/2009 |
| EP | 2161615 | 3/2010 |
| EP | 2357544 | 8/2011 |
| EP | 2764998 A1 | 8/2014 |
| JP | 63-208830 | 8/1988 |
| JP | 02-132420 | 5/1990 |
| JP | 05-178645 | 7/1993 |
| JP | 10-063216 | 3/1998 |
| JP | 2004-245985 | 9/2004 |
| JP | 4694816 B2 | 6/2011 |
| JP | 4799113 B2 | 10/2011 |
| JP | 2013-057975 A | 3/2013 |
| KR | 20-0412640 | 3/2006 |
| KR | 10-752041 B1 | 8/2007 |
| KR | 10-2008-0022319 | 3/2008 |
| KR | 10-2009-0026181 | 3/2009 |
| KR | 10-0904847 B1 | 6/2009 |
| KR | 10-0931183 | 12/2009 |
| KR | 10-2010-0034361 | 4/2010 |
| KR | 10-2011-0003698 | 1/2011 |
| KR | 10-2011-0094672 | 8/2011 |
| WO | WO98/16870 | 4/1998 |
| WO | WO02-13052 | 2/2002 |
| WO | WO2004/003649 | 1/2004 |
| WO | WO2005/098811 | 10/2005 |
| WO | WO2005/103807 | 11/2005 |
| WO | WO2007/016546 A2 | 2/2007 |
| WO | WO2007/146862 | 12/2007 |
| WO | WO2008/030018 | 3/2008 |
| WO | WO2008/147322 | 12/2008 |
| WO | WO2009/124647 | 10/2009 |
| WO | WO2010/120771 | 10/2010 |
| WO | WO2011/020478 | 2/2011 |
| WO | WO2011/087684 | 7/2011 |
| WO | WO2011/087687 | 7/2011 |
| WO | WO2011/124720 | 10/2011 |
| WO | WO2011/127015 | 10/2011 |
| WO | WO2012/079159 | 6/2012 |
| WO | WO2012/080618 | 6/2012 |
| WO | WO2012/080656 | 6/2012 |
| WO | WO2012/080657 | 6/2012 |
| WO | WO2012/145155 | 10/2012 |
| WO | WO2013/059674 | 4/2013 |
| WO | WO2013/109881 | 7/2013 |
| WO | WO2013/155467 | 10/2013 |
| WO | WO2014/121863 | 8/2014 |
| WO | WO2014/130471 | 8/2014 |
| WO | WO2014/134451 | 9/2014 |
| WO | WO2014/209812 A1 | 12/2014 |
| WO | WO2015/077097 A1 | 5/2015 |

OTHER PUBLICATIONS

U.S. Appl. No. 14/489,414, filed Sep. 17, 2014.
U.S. Appl. No. 14/535,080, filed Nov. 6, 2014 + preliminary amendment filed Nov. 7, 2014.
Preliminary Amendment filed Oct. 7, 2014 for U.S. Appl. No. 14/391,122.
U.S. Appl. No. 14/657,380, filed Mar. 13, 2015 + preliminary amendment filed Mar. 16, 2015.
U.S. Appl. No. 14/735,043, filed Jun. 9, 2015 and Preliminary Amendment filed Jul. 2, 2015.
U.S. Office Action dated Oct. 6, 2014 in U.S. Appl. No. 13/049,756.
U.S. Final Office Action dated Jul. 2, 2015 in U.S. Appl. No. 13/049,756.
U.S. Office Action dated Oct. 6, 2014 in U.S. Appl. No. 13/968,258.
U.S. Final Office Action dated Jun. 5, 2015 U.S. Appl. No. 13/968,258.
US Office Action dated Jul. 3, 2014 in U.S. Appl. No. 13/479,137.
US Final Office Action dated Feb. 26, 2015 in U.S. Appl. No. 13/479,137.
US Notice of Allowance dated May 14, 2015 in U.S. Appl. No. 13/479,137.
US Notice of Allowance (supplemental) dated Jun. 12, 2015 in U.S. Appl. No. 13/479,137.
US Office Action dated Jan. 16, 2015 in U.S. Appl. No. 14/468,778.
Notice of Allowanced dated Jun. 17, 2014 in U.S. Appl. No. 13/309,990.
US Office Action dated Feb. 24, 2015 in U.S. Appl. No. 14/163,026.
US Final Office Action dated May 16, 2014 in U.S. Appl. No. 13/449,248.
US Office Action dated Sep. 29, 2014 in U.S. Appl. No. 13/449,248.
US Final Office Action dated May 15, 2014 in U.S. Appl. No. 13/449,251.
US Office Action dated Oct. 28, 2014 in U.S. Appl. No. 13/449,251.
US Office Action dated Jun. 3, 2015 in U.S. Appl. No. 13/449,251.
US Office Action dated Sep. 15, 2014 in U.S. Appl. No. 13/682,618.
US Notice of Allowance dated Jan. 22, 2015 in U.S. Appl. No. 13/682,618.
US Notice of Allowance dated Apr. 13, 2015 in U.S. Appl. No. 14/657,380.
Letter dated Dec. 1, 2014 re Prior Art re U.S. Appl. No. 13/772,969 from Ryan D. Ricks representing MechoShade Systems, Inc.
Third-Party Submission dated Feb. 2, 2015 and Feb. 18, 2015 PTO Notice re Third-Party Submission for U.S. Appl. No. 13/772,969.
International Preliminary Report on Patentability dated May 1, 2014 in PCT/US2012/061137.
International Preliminary Report on Patentability dated Oct. 30, 2014 issued in PCT/US2013/036235.
International Preliminary Report on Patentability dated Oct. 23, 2014 issued in PCT/US2013/036456.
International Preliminary Report on Patentability dated Oct. 30, 2014 issued in PCT/US2013/034998.
International Preliminary Report on Patentability dated Feb. 19, 2015 issued in PCT/US2013/053625.
International Search Report and Written Opinion dated May 26, 2014, issued in PCT/US2014/016974.
Communication re Third-Party Observation dated Dec. 4, 2014 and Third-Party Observation dated Dec. 3, 2014 in PCT/US2014/016974.
International Search Report and Written Opinion dated Oct. 16, 2014, issued in PCT/US2014/043514.

(56) References Cited

OTHER PUBLICATIONS

Chinese Office Action dated Mar. 26, 2015 in Chinese Application No. 2015032301101560.
European Search Report dated Aug. 11, 2014 in European Application No. 12757877.1.
European Search Report dated Jul. 29, 2014 in European Application No. 12758250.0.
European Search Report dated Jul. 23, 2014 in European Application No. 12756917.6.
European Search Report dated Mar. 5, 2015 in European Application No. 12841714.4.
APC by Schneider Electric, Smart-UPS 120V Product Brochure, 2013, 8 pp.
Hoosier Energy, "How do they do that? Measuring Real-Time Cloud Activity" Hoosier Energy Current Connections, undated. (http://members.questline.com/Article.aspx?articleID=18550&accountID=196000&nl=11774).
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Haby, Jeff, "Cloud Detection (IR v. VIS)," (undated) [http://theweatherprediction.com/habyhints2/512/].
Graham, Steve, "Clouds & Radiation," Mar. 1, 1999. [http://earthobservatory.nasa.gov/Features/Clouds/].
National Aeronautics & Space Administration, "Cloud Radar System (CRC)," (undated) [http://har.gsfc.nasa.gov/index.php?section=12].
Science and Technology Facilities Council. "Cloud Radar: Predicting the Weather More Accurately." ScienceDaily, Oct. 1, 2008. [www.sciencedaily.com/releases/2008/09/080924085200.htm].
"Remote Sensing: Clouds," Department of Atmospheric and Ocean Science, University of Maryland, (undated) [http://www.atmos.umd.edu/~pinker/remote_sensing_clouds.htm].
National Aeronautics & Space Administration, "Cloud Remote Sensing and Modeling," (undated) [http://atmospheres.gsfc.nasa.gov/climate/index.php?section=134].
Kipp & Zonen, "Solar Radiation" (undated) [http://www.kippzonen.com/Knowledge-Center/Theoretical-info/Solar-Radiation].
Duchon, Claude E. et al., "Estimating Cloud Type from Pyranometer Observations," Journal of Applied Meteorology, vol. 38, Jan. 1999, pp. 132-141.
Cardinal IG Technical Service Bulletin #IG13-05/08, "Capillary Tubes & Breather Tubes", May 2008, 2 pp.
Renovate by Berkowitz advertisement for "Glass Retrofit System", Rbbwindow.com, 1 page [add date].
U.S. Appl. No. 13/968,258, filed Aug. 15, 2013.
U.S. Appl. No. 14/163,026, filed Jan. 24, 2014.
U.S. Appl. No. 13/772,969, filed Feb. 21, 2013.
U.S. Appl. No. 13/931,459, filed Jun. 28, 2013.
U.S. Office Action dated Jan. 18, 2013 in U.S. Appl. No. 13/049,756.
U.S. Final Office Action dated Aug. 19, 2013 in U.S. Appl. No. 13/049,756.
US Office Action dated Feb. 3, 2012 in U.S. Appl. No. 13/049,750.
US Final Office Action dated Apr. 30, 2012 in U.S. Appl. No. 13/049,750.
US Notice of Allowance dated May 8, 2012 in U.S. Appl. No. 13/049,750.
US Office Action dated Sep. 23, 2013 in U.S. Appl. No. 13/479,137.
US Final Office Action dated Jan. 27, 2014 in U.S. Appl. No. 13/479,137.
US Office Action dated Mar. 27, 2012 in U.S. Appl. No. 13/049,623.
US Notice of Allowance dated Jul. 20, 2012 in U.S. Appl. No. 13/049,623.
US Office Action dated Dec. 24, 2013 in U.S. Appl. No. 13/309,990.
US Office Action dated Oct. 11, 2013 in U.S. Appl. No. 13/449,235.
US Notice of Allowance dated Jan. 10, 2014 in U.S. Appl. No. 13/449,235.
US Office Action dated Nov. 29, 2013 in U.S. Appl. No. 13/449,248
US Office Action dated Nov. 29, 2013 in U.S. Appl. No. 13/449,251.
International Search Report and Written Opinion dated Sep. 26, 2012, issued in PCT/US2012/027828.
International Preliminary Report on Patentability dated Sep. 26, 2013, issued in PCT/US2012/027828.
International Search Report and Written Opinion dated Sep. 24, 2012, issued in PCT/US2012/027909.
International Preliminary Report on Patentability dated Sep. 26, 2013, issued in PCT/US2012/027909.
International Search Report and Written Opinion dated Sep. 24, 2012, issued in PCT/US2012/027742.
International Preliminary Report on Patentability dated Sep. 26, 2013, issued in PCT/US2012/027742.
International Search Report and Written Opinion dated Mar. 28, 2013 in PCT/US2012/061137.
International Search Report and Written Opinion dated Jul. 23, 2013, issued in PCT/US2013/036235.
International Search Report and Written Opinion dated Jul. 26, 2013, issued in PCT/US2013/036456.
International Search Report and Written Opinion dated Jul. 11, 2013, issued in PCT/US2013/034998.
International Search Report and Written Opinion dated Dec. 26, 2013, issued in PCT/US2013/053625.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
"How Cleantech wants to make a 2012 comeback" http://mountainview.patch.com/articles/how-cleantech-wants-to-make-a-2012-comeback, Jan. 23, 2012.
International Search Report and Written Opinion dated Feb. 23, 2016, issued in PCT/US2015/062530.
Chinese Office Action dated Nov. 27, 2015 in Chinese Application No. 2015032301101560.
European Office Action dated Dec. 2, 2015 in EP Application No. 12841714.4.

MITIGATING THERMAL SHOCK IN TINTABLE WINDOWS

CROSS-REFERENCE TO RELATED APPLICATION

This is a national stage application under 35 U.S.C. 371 to International Application Number PCT/US2012/061137 (designating the United States), filed on Oct. 19, 2012 and titled "MITIGATING THERMAL SHOCK IN TINTABLE WINDOWS," which claims benefit of U.S. Provisional Patent Application Ser. No. 61/550,277 filed Oct. 21, 2011, both of which are hereby incorporated by reference in their entirety and for all purposes.

FIELD

The disclosure relates to smart window technology, and relates more particularly to control methods and systems for mitigating thermal shock in smart windows that have active control capability.

BACKGROUND

Numerous challenges confront manufacturers of "smart" windows. For example, manufacturers must coat large window substrates with sophisticated coatings such as electrochromic device coatings. The coating process must be conducted with high throughput and high yield. Inevitably defects will crop up in some coatings. In some cases, a defect or group of defects affects only a small portion of the window substrate and, as a consequence, may be addressed by removing the affected portion of the window substrate and using the remainder of the substrate to form smaller windows. Unfortunately, this approach is generally incompatible with strengthening processes such as tempering. Also, there are many reasons why fabricating smart windows on non-tempered substrates may be desirable. However, switchable smart windows fabricated on such window substrates are more susceptible to breakage. For example, such windows are more susceptible to thermal gradients and may break under conditions where a tempered window substrate might not.

SUMMARY

Control algorithms for optically switchable devices are used not only for driving the transitions of the optical device for the sake of a desired optical state to the end user, but also for controlling the physical properties of the optically switchable device, particularly thermal properties, in order to avoid thermal shock. Tintable optical components such as windows are provided with a controller designed or configured to control the tinting in a manner that resists exposure to damaging thermal shock. The controller determines that a trigger condition for thermal shock is occurring or is about to occur and takes steps to avoid damaging thermal shock. In some cases, these steps include increasing the transmissivity of the optical component or holding the component in a highly transmissive state. In some cases, the steps involve heating the component. In certain embodiments, combinations of these and other control parameters are used to mitigate or avoid thermal shock.

These and other features and embodiments will be described in more detail below with reference to the drawings.

DETAILED DESCRIPTION

Figure 1A:
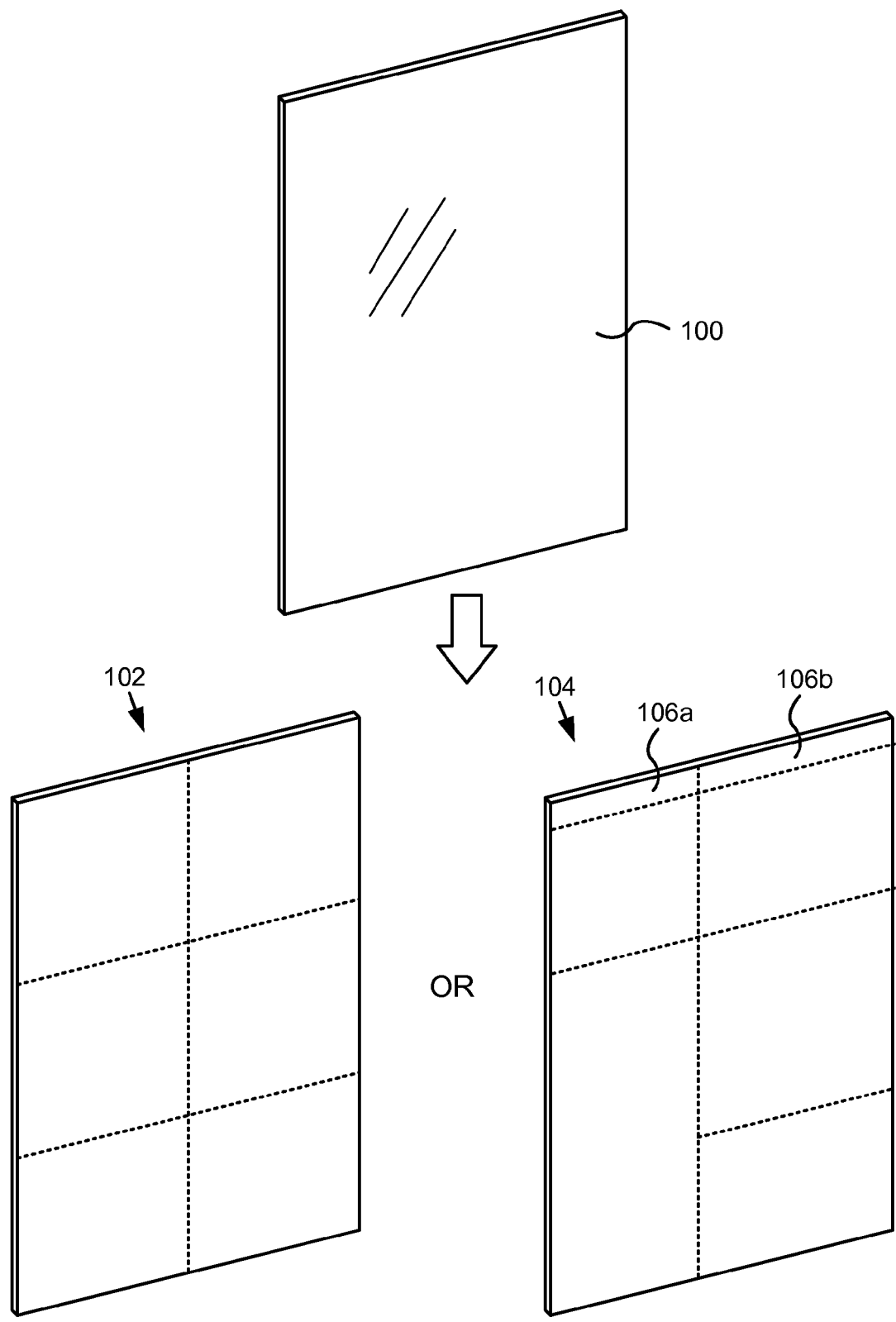
FIGS. 1A and 1B are schematic drawings depicting coat and cut aspects of certain disclosed fabrication methods.

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments.

Introduction

Various embodiments disclosed herein pertain to controllers for switchable optical devices coated onto windows or other optical components. Certain embodiments pertain to methods of switching optical states in such optical devices. The switchable optical device changes an optical property such as transmissivity, color, or reflectivity in response to an electrical signal. An example of a switchable optical device is an electrochromic device. Other examples include liquid crystal devices and suspended particle devices. Often for convenience in the discussion that follows, a switchable device is described as an "electrochromic device." However, the associated discussion should not be construed as being limited to electrochromic devices. Various details associated with the structure, fabrication, and operation of electrochromic devices are presented below.

Generally, the optical components described herein are windows, mirrors, research tools, etc. containing a substrate coated with the optical device. The substrate is typically transparent or substantially transparent. Examples of substantially transparent substrates include both sheets of inorganic materials such as silica or silicate based materials and sheets of organic materials such as acrylic and polycarbonate polymers. Generally, the substrates are substantially rigid. Specific examples of glass sheets include float glass, Gorilla® Glass (a trade name for alkali-aluminosilicate sheet glass available from Dow Corning, Corp. of Midland, Mich.), and the like. An example of an organic substrate is Plexiglas. For the purposes of simplicity "glass sheet" is used from herein to include all types of window substrate, unless otherwise specifically qualified.

In one embodiment, the glass sheet is float glass, coated with a transparent conducting oxide (TCO) and a diffusion barrier layer. Examples of such glasses include conductive layer coated glasses sold under the trademark TEC® Glass by Pilkington, of Toledo, Ohio and SUNGATE® 300 and SUNGATE® 500 by PPG Industries of Pittsburgh, Pa. TEC® Glass is a glass coated with a fluorinated tin oxide conductive layer. A diffusion barrier layer may be provided between the TCO and the float glass to prevent sodium from diffusing from the glass into the TCO. In one embodiment, the glass sheet does not have a preformed TCO or diffusion barrier on it. For example, in one embodiment the diffusion barrier, a first TCO, an electrochromic stack and a second TCO are all formed in a single apparatus under a controlled ambient environment (infra). The glass sheet may be heat strengthened prior to fabrication of an electrochromic (EC) device thereon.

The optical components described herein may be fabricated from a large glass sheet having a size that is at least equal to the largest component contemplated for manufacture. In various embodiments, the large glass sheet is intended to be cut into smaller panes at a later stage of the process. In certain embodiments, the panes are intended to be used as windows, so the physical dimensions as well as the optical and mechanical properties of the associated substrate should be appropriate for the intended window application.

In a typical example, the large glass sheet employed at operation is a piece of glass of between about 3 meters and about 6 meters in length on at least one side. In some cases, the glass is rectangular, being about 3 to 6 meters high and about 1.5 to 3 meters wide. In a specific embodiment, the glass sheet is about 2 meters wide and about 3 meters high. In one embodiment, the glass is six feet by ten feet. Whatever the dimensions of the glass sheet, the fabrication equipment is designed to accommodate and process many such sheets, fabricating switchable optical devices on such sheets, one after another in succession.

Coat and Cut

For window applications, it is important that switchable panes be both strong and relatively free of defects. Conventionally, glass panes are strengthened by tempering. Unfortunately, the tempering process—which involves heating to above the annealing point of glass followed by rapid cooling—can introduce defects in an electrochromic device. Hence, most efforts to produce electrochromic windows employ a fabrication sequence of first cutting a glass pane to size, then tempering the glass, and finally forming the electrochromic device on the tempered window pane. The electrochromic device is typically formed by depositing a sequence of thin layers on one side of the pre-cut and tempered glass pane. Unfortunately, the described sequence of cutting, tempering, and then forming the electrochromic device frequently gives rise to low quality electrochromic windows because device fabrication processes sometimes produce one or more visible defects on an electrochromic device. Of course, the manufacturer may refuse to tolerate low quality devices, but rejection of low quality panes results in a reduction in yield.

In accordance with various embodiments, the window fabrication is performed in a "coat and cut" procedure, whereby an electrochromic device (or other switchable coating) is fabricated in a manner that substantially covers a large transparent sheet. Only later is a cutting pattern for multiple electrochromic panes defined on the transparent sheet. The cutting pattern may take into account various considerations including utilization of the sheet, defects in the electrochromic device as fabricated, economic demand for particular sizes and shapes of electrochromic panes, non-uniformity in the device and/or glass sheet, etc. An example of a coat and cut process is described in detail in U.S. patent application Ser. No. 12/941,882, filed Nov. 8, 2010, and titled "ELECTROCHROMIC WINDOW FABRICATION METHODS," which is hereby incorporated by reference in its entirety.

For context, FIG. 1A depicts a glass sheet 100 for example about 3 meters by about 2 meters or about 120 inches by 72 inches, with an electrochromic device (not shown separately) thereon. In this example, a cutting pattern (as indicated by the dotted lines) is defined for cutting one or more panes from glass sheet 100. Depending upon, for example, the level of defectivity, demand, etc., the cutting pattern can be regular, such as pattern 102, or irregular, such as pattern 104. Pattern 104 includes areas 106a and 106b, which collectively make a strip of glass that may be discarded due to, for example, roll off and/or higher defect levels than the rest of the glass sheet. These perimeter areas may also be removed because of back side contamination of electrochromic device materials due to overspray. From a single glass sheet, the one or more panes can be of the same size, or varying size depending on the need.

Figure 1B:
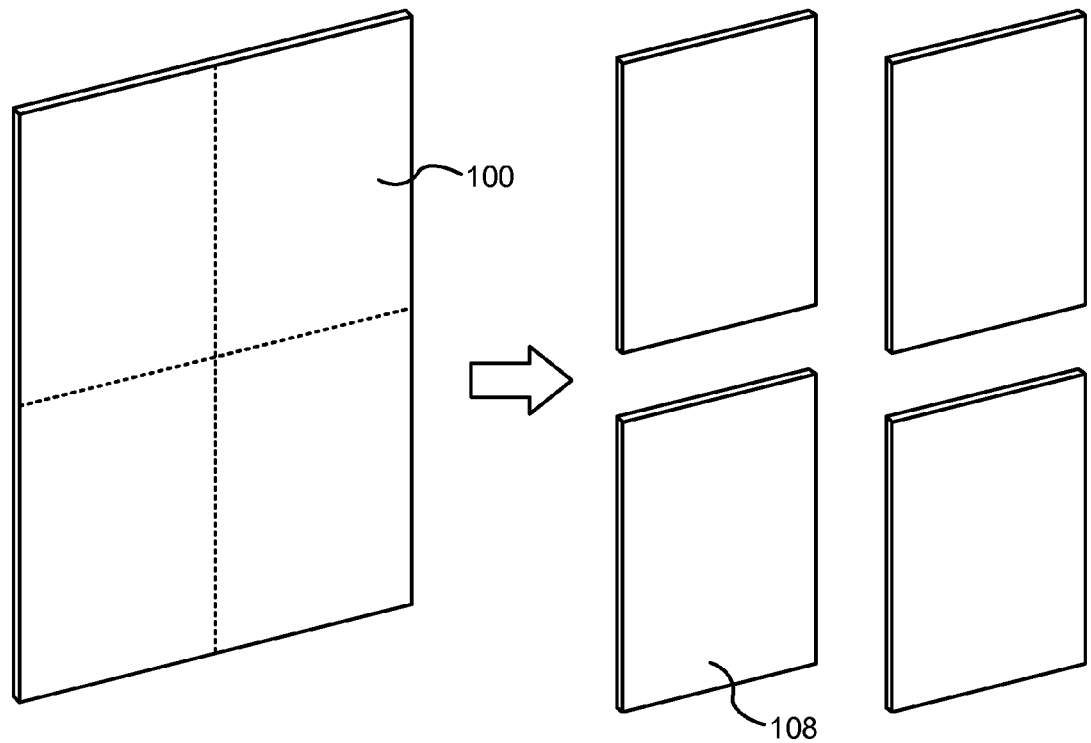
Figure 1B:
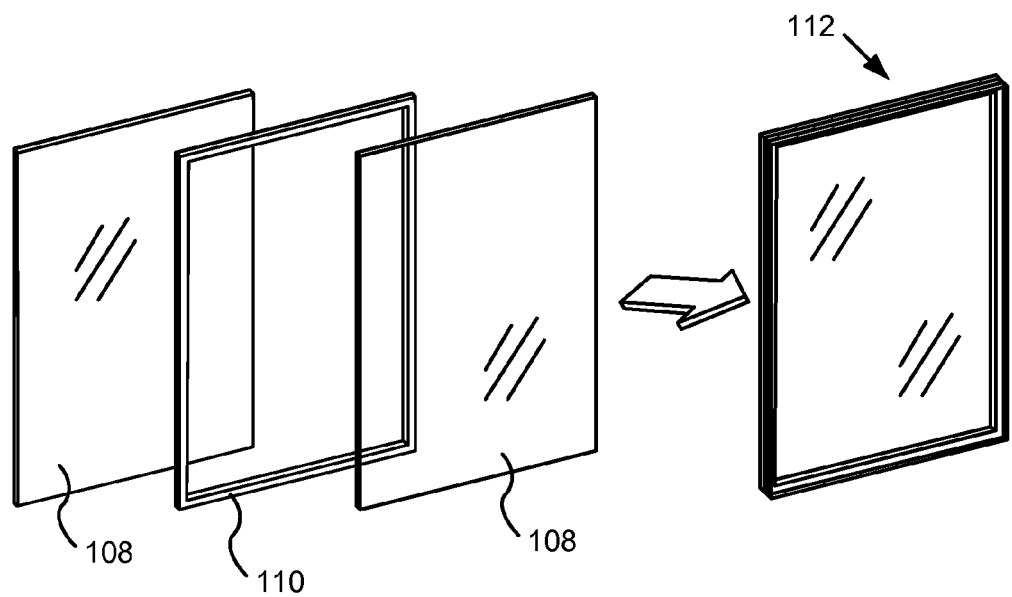

Referring to FIG. 1B, glass sheet 100 is cut according to a cutting pattern derived from, for example, a post-coat evaluation of the electrochromic device coating. In this example, four panes 108 are produced. Further, in this example, two of panes 108 are paired and combined with a sealing separator 110 to form an IGU 112. In this example, IGU 112 has two electrochromic panes. Typically, but not necessarily, the panes are arranged so that electrochromic devices face inside the IGU 112 so as to be protected from the ambient. Electrochromic windows having two or more electrochromic panes are described in U.S. patent application Ser. No. 12/851,514, filed on Aug. 5, 2010, and titled "MULTI-PANE ELECTROCHROMIC WINDOWS," which is hereby incorporated by reference in its entirety. Such multi-pane windows or IGUs have the benefit of providing 4 discrete transmissivity states. A separate advantage to such multi-pane electrochromic windows is that the likelihood of two defects aligning perfectly, and thus being observable to the end user, is quite small. Methods described therein are particularly useful for making electrochromic panes for use in multi-pane electrochromic windows. In embodiments where, for example, two electrochromic panes are used in a single window, defect mapping data sets can be used to further ensure that defects on individual panes, when registered in an IGU, do not align. This may be a criterion that may be considered in patterning the glass sheet.

Unfortunately, when using a coat and cut procedure, the window or other optical component may lack sufficient strength. However, if the glass is strengthened by tempering before coating, then it cannot be easily cut. On the other hand, if the glass is coated and cut prior to tempering, the coating must be able to withstand the tempering process. As mentioned, sophisticated coatings such as electrochromic device coatings often cannot withstand tempering. Such coatings may be sensitive to the tempering process and may be damaged or destroyed during it.

To address this problem, one might consider strengthening a coated window in some other manner, such as by a heat treating process that is less severe than tempering or by laminating the coated glass to a previously tempered or otherwise strengthened pane of glass. Both of these approaches suffer from some difficulties. For example, both of them fail to address the problem of glass cracking in response to a thermal shock produced by a large thermal gradient or thermal stress in the glass induced by exposure to high temperatures.

Thermal Shock

The thermal shock to be avoided is a level of thermal stress (and associated thermal strain) induced by a change in temperature (or a thermal gradient) sufficient to cause a monolithic glass pane or window to crack or experience other damage such as spalling, inelastic deformation, etc. As used herein, the term "thermal shock" is intended to cover all types of damaging thermal stresses or strains induced by exposure of a pane or window to thermal effects. In this context, "monolithic" glass panes include those that are laminated to other panes. In some cases, the damaging internal stress or strain may be caused by local changes in the thermal expansion of material volume within a glass pane. For example, if one side of glass pane is expanding (e.g., due to high temperatures) while the other side is not, damaging thermal shock may result.

Thermal shock in a coated window can arise in many different ways. Typically, it is driven by an external condition or event that causes a high spatial and/or temporal thermal gradient in the window. Often, thermal shock is the result of a high thermal gradient between the center of the window and the edge of the window, which edge contacts a frame and/or a portion of a building in which the window is mounted.

The high thermal gradient in the window can be introduced by absorption of solar radiation by the window or window coating. For example, a high thermal gradient can be introduced when a window goes from a low solar exposure state to a high solar exposure state. Some coatings such as electrochromic device coatings periodically produce low-transmissivity states where the transmissivity of the window is relatively low (e.g. less than about 40%). Concomitantly, such states increase the absorption of solar radiation by the window. Absorbed solar radiation is rapidly converted into thermal energy which may be dumped directly onto the face of the window and can induce thermal shock in some cases.

One example of a situation where a high thermal gradient may induce thermal shock causing a window to break is exposure of an electrochromic window to solar radiation during sunrise. Typically, the building in which the window resides is relatively cold immediately before sunrise. At that point, the window itself is likely to be in thermal equilibrium with the remainder of the building and consequently it too has a relatively low temperature. As the sun rises and solar radiation begins impinging on the window, a controller of the electrochromic device may cause the electrochromic device to transition to a relatively opaque state (or the window may have already been in an opaque state). Normally, the opacity of a window is controlled to reduce the need for air conditioning or other HVAC resources within the building. Unfortunately, when the window is an opaque state it may absorb a large quantity of solar radiation very quickly. As a consequence, the center region of the window heats very rapidly, while the edges of the window may be maintained at a relatively low temperature due to their contact with a metal frame or other component of the building or an insulated glass unit. This center-to-edge thermal gradient creates significant internal stress and strain, which can induce thermal shock causing the window to break or other damage.

Susceptibility to thermal shock is particularly pronounced in low-humidity or desert environments where solar radiation is relatively intense at sunrise. The problem is particularly acute in such environments where the night-time temperature is relatively low (e.g., at or below about 0° C.).

Of course, there are other situations that give rise to thermal shock in a window. Some of these include changes in weather patterns, temporary shading of windows due to neighboring obstacles, a rapid change in the interior temperature of the building, etc.

In many cases, thermal shock may be induced by a high thermal gradient (large temperature change) in the window. Such a high thermal gradient can be a temporal gradient and/or spatial gradient. By temporal, it is meant that the change in temperature occurring over time is high. For example, a large change in temperature occurring over a relatively short period of time has a high temporal thermal gradient (temporal gradient). By spatial, it is meant that the change in temperature occurring over a distance on the window is high. For example, a large change in temperature occurring over a relatively short distance across the window has a high spatial thermal gradient (spatial gradient). The severity of the thermal gradient (i.e., its ability to induce thermal shock) may be a nonlinear function of the average or starting window temperature and/or ending window temperature.

In some cases, the potential damage from thermal shock to a window is created not by a "shock" per se, but by continuous exposure over a period of time to a condition that induces significant thermal stress or strain in a window. One example of this condition arises in late afternoon on west facing windows in locations where the external temperature frequently exceeds a threshold value (e.g., 35° C.).

Controller Operation to Mitigate the Risk of Thermal Shock

Disclosed embodiments address the problem of thermal shock by introducing or modifying controller functionality to reduce or eliminate a cause of thermal shock. Typically this involves controlling the switchable device coating to reduce or avoid creation of a high thermal gradient at the window or optical component.

This approach has particular value when applied to windows that have not been strengthened in a way that reduces their susceptibility to damage from thermal shock. In some embodiments, the approach is applied to windows that have not been tempered. However, the approach can also be applied to tempered or strengthened windows (e.g., windows strengthened by heat treating or lamination). Additionally, this approach is particularly applicable to coated windows that were produced via a coat and then cut fabrication process. Of particular interest are windows having electrochromic device coatings.

The controller functionality that is introduced or modified in accordance with the certain embodiments typically includes two functional components. First, there is a triggering condition that is detected or predicted. Second, in response to this triggering condition, there is a controller action to mitigate the risk of thermal shock.

1. Trigger Conditions

Trigger conditions are conditions that if left unchecked could produce thermal shock or could progress to a condition that could produce thermal shock. Some trigger conditions are predicted based on an expected event that is likely to induce thermal shock. Other trigger conditions are conditions detected in real time at or near the window location and do not involve prediction.

Regarding the trigger conditions that involve predicting a condition that will result in thermal shock, these often involve a recognition that a particular event will cause a rapid change in the flux of solar radiation or other source of thermal energy impinging on a window. Typically, though not necessarily, they do not rely on any sensed external condition. They may be recurring events, for example, that occur with some predictable regularity or periodicity. Some examples of recurring events are associated with what may be referred to as rhythms of the earth such as sunrise, sunset, or seasonal variations in the position of the sun. For example, the sun's position during certain seasons may directly face a window. During such seasons, the window may be more susceptible to thermal shock and consequently a trigger condition exists only during those seasons and/or for certain portions of the daylight hours. Other examples include predicted changes in the weather such as a rapid transition from cloudy to sunny conditions, the rapid approach of a front (warm or cold), and partial or complete shading of a window by a building feature (e.g., an overhang) or a neighboring obstacle (e.g., a tree or an adjacent building).

In the second category of trigger conditions (i.e., events detected in real time), certain embodiments involve detection of one or more large temperature gradients in the window. The detected large temperature gradients can be large temperature changes over relatively short times (temporal gradients) and/or large temperature changes over relatively short distances (spatial gradients). Either of these may require sensors or a sensing capability provided within the window or building. For example, sensors or a sensing capability may measure the temperature at different positions of the window, IGU with the window, inside/outside the building, other areas near the window, and at different times. For example, the ambient temperatures on the outside and/or inside of the building may be monitored with thermocouples, thermometers, or other temperature sensing devices. Additionally, temperature sensing devices may be built directly into the window or an IGU containing the window. In one specific embodiment, one or more temperature sensing devices is deployed in the frame spacer of an IGU. In another specific embodiment, temperature sensing devices are provided at different positions on or near the face of a glass pane. For example, two, three, or four temperature sensing devices may be deployed at corners of a window pane. Such devices have the advantage of determining the temperature very close to the location of the window or near the window edge. Also, temperature can be inferred by measuring the current versus voltage characteristics of an electrochromic device coated onto the window. One or more of these tools can be used to measure temperatures at different positions of the window and at different times, and can be used to detect a high temperature gradient from the measured temperatures. Using any one or more of these tools, a detected high temperature gradient, either spatial or temporal, can serve as a triggering event.

Additionally, in some embodiments, a combination of temperature at the window and transmissivity of the coating may serve as a triggering event. For example, if the temperature at the window reaches a particular threshold level and concurrently the window is at or below a particular threshold level of transmissivity, then the trigger condition is met. In another example, a combination of a threshold temperature and a detected level of incident solar radiation can serve as a triggering event. In such embodiments, it may be appropriate to include in the window a temperature sensing device that detects transmissivity of the window and/or the solar radiation flux, as appropriate.

2. Triggered Operations in Response to Trigger

The controller operation designed to avoid or mitigate thermal shock may take many forms. Generally it will be executed upon or shortly after detection of the triggering condition. Of course, in the case of a predicted or forecast trigger condition, the prediction itself may occur far in advance of the operation. In the case of a real time detected trigger condition, however, the compensating controller operation may execute within about 30 minutes or less of the detected condition, or in some embodiments, within about 10 minutes or less of the detected condition, or within about 1 minute or less of the detected condition.

In one approach, the controller action involves transitioning to, or maintaining, a very high transmissivity in the window. In specific embodiments, this means that the transmissivity of the window should be greater than a predetermined threshold value. Some examples of such threshold value include about at least 40% transmissivity, about at least 45% transmissivity, and about at least 50% transmissivity. It should be understood however that other thresholds may be appropriate in certain contexts. For example, wide glass panes and/or thick glass panes may be more susceptible to damage from thermal shock and hence require higher threshold values. Therefore, in many embodiments, the predetermined threshold value may be defined as a minimum transmissivity from between about 30 to 70%. The transmissivity of a window or other optical element is conventionally defined as the ratio of the directly transmitted light after passing through the participating medium (e.g., an electrochromic window) to the amount of light that would have passed the distance occupied by the medium in a vacuum. The problems of thermal shock including continuous thermal stress generally will not be manifest in a window pane that is completely clear.

In another mode of operation, when a triggering condition (e.g., trigger event) is detected and the window is in state where it would otherwise transition from a more transmissive state to a less transmissive state, the transition occurs more slowly than it would otherwise. For example, if it is determined that the desired less transmissive end state will, based on environmental conditions such as intense solar radiation, produce too much heat too quickly due to absorption of the energy, then the window is transitioned from the more transmissive state to the less transmissive state more slowly than it otherwise would. Further, the transition may be accompanied by an intermediate state between the more and less transmissive end states. For example, if the more transmissive state is 98% transmissivity and the less transmissive state is 40% transmissivity and the transition time would normally be 5 minutes, the controller can be programmed to slow the transition time to about 30 minutes. This slower transition time may be accompanied by one or more intermediate states at, e.g., 80% and 60% transmissivity. Intermediate states in electrochromic devices can be produced using various mechanisms. For example, a two pane—two electrochromic device window unit, with each electrochromic device having a different end states, may be employed as described in U.S. Pat. No. 8,270,059, issued on Sep. 18, 2012 and titled "MULTI-PANE ELECTROCHROMIC WINDOWS," which is hereby incorporated by reference in its entirety. Controller functionality for producing intermediate states is described in U.S. Pat. No. 8,254,013, issued on Aug. 28, 2012 and titled "CONTROLLING TRANSITIONS IN OPTICALLY SWITCHABLE DEVICES," which is also hereby incorporated by reference in its entirety.

In still another mode of operation, when the triggering condition (e.g., triggering event) is detected, all controller functionality that would normally drive a switch in optical state of the window is overridden. In one example, during this override condition the window coating remains in a transmissive state, even though a controller algorithm might otherwise dictate that the window transition to a more opaque state. This override can remain in place until a particular release condition is detected. Detection of the release condition is a trigger for reinstating normal controller functionality. Examples of release conditions include reduction in a detected temperature gradient to a value below a defined threshold, reduction in solar radiation flux to a level below a defined threshold, one hour after sunrise, etc.

Another example of a controller's compensating functionality involves thermally heating or cooling the window to avoid thermal shock. This functionality may be employed if the window includes some mechanism for introducing such heating. As an example, the window may have a coating (possibly the electrochromic coating itself) that heats up resistively when current is applied to it. In another example, the frame itself is heated. These approaches may mitigate the risk that the center of the window heats to a temperature that is much higher than that of the frame during sunrise. In another example, or in combination with a heating function, the window unit may include a cooling mechanism such as a cooling fan, which exchanges hot air in or around the IGU with cool air, thus cooling the window and mitigating temperature extremes, especially over short time spans or distances.

Yet another example of a controller action that might be taken is transitioning the window to, or holding the window in, a relatively un-transmissive state, i.e., an opaque state. This may be appropriate in very limited situations such as when the temperature inside the building rapidly increases, such as during a fire.

Examples of Controller Algorithms

In one example, the controller algorithm is driven by a table of trigger conditions which require transition to a defined transmissivity level (e.g., at least about 40%). The trigger conditions may include specified temperature levels, temperature gradients, and/or illumination levels. For example, one trigger condition may be an external temperature of at least 40° C. is maintained for one hour or longer. Another trigger condition may be a window temperature change of at least 10° C. over a period of 15 minutes or less. Still another trigger condition may be a variation in window temperature of at least 5° C. between any two corners of the window or between the interior and exterior faces of the window. As mentioned, the transition to a higher transmissivity state may be accomplished at a defined rate, which in one embodiment is as fast as possible for the device.

In another example, the controller algorithm is triggered at a defined time prior to sunrise (e.g., about 30 minutes prior to sunrise), at which time signals are provided to the window to transition to (or maintain) a transmissivity of at least a defined value (e.g., at least about 55%), then maintain that level of transmissivity for a defined period of time (e.g., about 45 minutes after sunrise).

In yet another example, a trigger condition is detected (e.g., the temperature difference between two different corners of a window pane is at least about 10° C.) when the controller would otherwise cause the window to transition from a transparent to more opaque state. In this example, the controller algorithm triggers a slow transition, e.g., over about 90 minutes.

In a further example, when a large change in the flux of solar radiation is forecast (e.g., when the sun is about to rise), the window (or at least a window edge) is heated shortly prior to the time when the flux is to occur. For example, the window may be heated about 10-30 minutes prior to the forecast event. In one embodiment, heating is accomplished by delivering current to the bus bars on the optical switching device. The current may be delivered in an oscillatory fashion to provide relatively large resistive heating with relatively little change in optical state. In another embodiment, a heater is embedded in a frame spacer of a window IGU and the heater is activated prior to the forecast event as described.

In another example, when a large change in the temperature is forecast (e.g., on a hot sunny day where a storm front is expected to move in), the window is cooled shortly prior to the time when the cooling event (rain) is to occur. For example, the window may be cooled about 10-30 minutes prior to the forecast event. In one embodiment, cooling is accomplished by one or more cooling fans, such as bladeless turbofans in the window framing, proximate the IGU, that silently cool the window, e.g. a window in a low-transmissivity state, with or without transitioning the window to a higher transmissivity state. This cooling capability allows for flexibility in the control function, e.g., the sun may still be shining intensely just prior to the storm front moving in—the occupants of the building can still enjoy a glare-free environment, while the window is being cooled in preparation for the rain that will arrive shortly and strike an otherwise too-hot window pane. The window is cooled sufficiently to avoid thermal shock when the rain strikes it, while still using as little energy as possible to operate the cooling mechanism, e.g., the cooling mechanism may be powered by photovoltaic cells, with or without a storage device to store the energy created by the photovoltaics.

Figure 8:
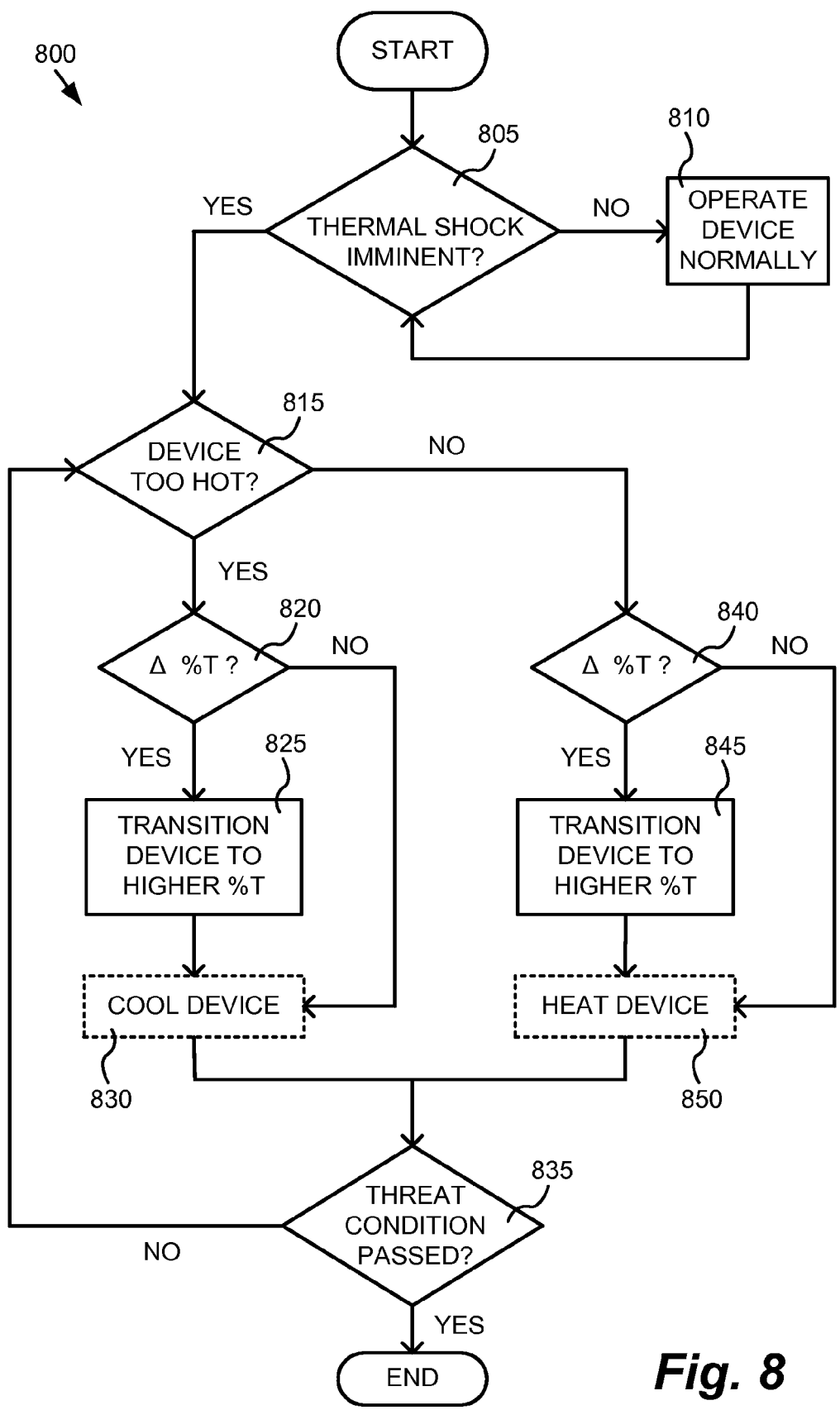
FIG. 8 is a flowchart depicting aspects of a process flow in accord with embodiments described herein.

FIG. 8 is a flowchart depicting aspects of a process flow 800, in accord with control algorithm embodiments described herein. Aspects of the process flow 800 can be used in a method of reducing the likelihood that that a controllably tintable window will experience thermal shock. First, a determination, depicted by decision block 805, is made whether or not a trigger condition likely to induce thermal shock to a window is likely to occur at a particular time, i.e. a trigger condition is met as described above. The particular time could be at the time of the determination, the time that a sensor determined a temperature gradient, a predicted time of high thermal gradient (e.g., at or about sunrise or sunset, at a time at or near a predicted change in weather conditions), etc. The window may be in a first tint state before this determination. This determination may be made on a periodic basis (e.g., every 60 minutes, 15 minutes, 5 minutes, etc.) in some cases. The trigger condition may be one of a plurality of trigger conditions including, for example, a rapid change in radiation flux striking the window, a rapid change in ambient temperature on the exterior side of the window, predefined temperature difference between two corners of the window, predefined temperature difference between the center and edge of the window, a pre-determined temperature difference between the environment proximate one face of the window and the environment proximate the other face of the window, and other conditions that may be likely to induce thermal shock to the window.

If the answer is "NO" at decision block 805, then the tintable window will operate normally, see 810. That is, at that snapshot in time the window will be in a first tint state, either statically or in the midst of a transition. If there is no danger of thermal shock in carrying out the current operation of the window, then the thermal shock algorithm does nothing, but continues to query with decision block 805. As long as there is no danger of thermal shock, the window will operate as programmed to do, or as manually controlled by the end user.

If the answer is "YES" at decision block 805, then the trigger condition (e.g., triggering event occurred) is met and there is an imminent danger of thermal shock. Therefore, the logic dictates another query at decision block 815, which asks if the window is too hot. "Too hot" in this context means that in comparison to the triggering condition (e.g. a triggering event that is either happening or about to happen), is the temperature of the device such that thermal shock will ensue if nothing is done to lower the current temperature of part or all of the window pane. If the answer at decision block 815 is "YES," then the window (e.g. the pane bearing the EC device) temperature must be lowered in anticipation of the triggering condition that will cause the thermal shock and/or to accommodate the temperature changes already taking place as a result of the triggering condition (e.g., triggering event).

The algorithm approaches this need to lower the temperature in anticipation of the triggering condition by asking another question, specifically, whether the current tint state should be changed, see 820. Since there is more than one way to address a situation when the window is too hot, it first needs to be determined if the current % T is to be held or not. For example, if the window is currently at a tint state that is desired to reduce glare in a room, then raising the % T may be unacceptable. If the answer to decision block 820 is "NO," then the window is cooled by means other than raising % T, see 830, e.g. via a fan. If the answer to decision block 820 is "YES," for example where increasing % T is acceptable, then this is done, see 825. This increased % T may be sufficient to address thermal shock, but if not, the window may also be actively cooled, see 830, this is optional.

In certain embodiments, the algorithm may override a choice, e.g. by an end user in manual operation mode, to keep the % T at the present value at decision block 820. That is, if the window temperature is such that thermal shock risk is very high, then the decision at block 820 will be dictated by the needs of the window, over the desire of the end user to keep the window tinted, e.g. to reduce glare. This override function can be implemented, e.g., by having stored temperature value differences, where if large enough the override protocol takes over, and only if acceptable, allowing the user to keep the % T "as is" during operation of the thermal shock avoidance algorithm. Thus, the algorithm can address a situation where the window's heat puts it at risk for thermal shock by raising % T, active cooling, or both, depending upon the circumstances. Since tinted windows may absorb solar energy quickly, transition to higher % T may alleviate heating sufficiently to avoid thermal shock, but in certain situations, this may not be enough. Active cooling may be necessary. In implementations without active cooling capability, decision block 820 would be unnecessary as the only means to cool the device is to reduce solar heat gain by raising % T.

Optionally, in addition to or in the alternative to raising % T, the window is actively cooled, see 830. For example, as described above, cooling is performed with a fan or fans proximate the window. In one embodiment, low-voltage fans may be used in the framing system of the EC window, e.g., to blow cooler air onto the glass and/or remove hot air proximate the EC lite. This may be done in scenarios where the glass is very hot and the potential change in temperature extreme, i.e. the glass must be cooled off more quickly in order to avoid thermal shock. One of ordinary skill in the art would appreciate that other cooling means would work as well. Generally, these are more complex than would typically be desired in a window and associated framing system, but are within the scope of this description.

Transitioning the EC lite to a higher % T may be done at an accelerated rate, relative to normal transition voltage/current parameters, and may include a hold at an intermediate state. If using an accelerated rate, the maximum operating voltages for normal operation may or may not be observed. In other words, it may be acceptable to use higher than normal operating voltages to transition the window quickly, as the algorithms are designed to avoid thermal shock induced macro-scale physical damage to the window, e.g. cracking the glass which would typically require replacement. Since these higher operating voltages are not used as often as normal operating voltages, the likelihood of long term damage to the EC device due to using higher voltages/current is not significant.

Upon changing the % T to a higher value at 825 and/or active cooling of the window at 830, a decision is made as to whether the threat condition passed or still exists, see 835. In other words, the algorithm uses the temperature of the EC lite or window to determine if there is still a risk of thermal shock. If the threat condition has passed, then the method ends. If the threat condition still poses a risk of thermal shock, then the algorithm returns to decision block 815.

There are scenarios, e.g. as described above, where the window is too cold relative to the triggering condition that will induce thermal shock. For example, where the window is at a low % T during a cold night, and the sun is about to rise and impart intense solar radiation to the tinted window. In these scenarios, at decision block 815, if the answer is "NO," i.e. the window is too cold, then a decision is made as to whether to change % T, see 840. If the answer is "YES," then the EC device is transitioned to a higher % T so as to reduce the amount of solar radiation that would otherwise be absorbed by the window and heat it too quickly, given the current low temperature of the glass, see 845. The device may optionally be actively heated as well, see 850. This may be done, e.g., if raising % T is deemed insufficient and/or the transition is not fast enough to stop the solar radiation from absorbing to an extent that imparts thermal shock to the glass. Heating may be done, e.g., by using one of the transparent conductive layers of the EC device as a resistive heating element, using a separate resistive heating element, blowing warm air onto the glass via heater fan, infrared irradiation, and the like. In certain instances, it will be desirable to keep the window tinted even though there is risk of thermal shock, e.g. the occupant does not want the intense morning sun entering the room. In such instances, the answer to decision block 840 will be "NO." In this case, the window is heated only, see 850. The window will be heated sufficiently to raise the temperature at least to a safe point so that when the solar radiation does strike the tinted window, thermal shock is avoided. As in the scenario where the window is too hot, there are instances where the decision of "NO" at block 840 is overridden in favor of raising % T, with or without also heating the window.

Upon changing the % T to a higher value and/or actively heating of the window, a decision is made as to whether the threat condition still exists, see 835. In other words, the algorithm uses the temperature of the EC lite or window to determine if there is still a risk of thermal shock at decision block 835. If the threat condition has passed, then the answer to decision block 835 is "YES" and the method ends. If the threat condition still poses a risk of thermal shock, then the answer to decision block 835 is "NO" and the algorithm returns to decision block 815.

In certain embodiments, algorithms also include a function to lower the % T when the window is cold in order to warm the window to an acceptable temperature via absorption of solar radiation. For example, in extremely cold climates, the windows might get so cold as to be in danger of thermal shock, e.g., due to differences in the coefficient of expansion of the annealed glass and the laminate of which it is a part. If the sun is shining, the window is brought to, or maintained, at a % T that allows the glass to be warmed, or stay warm, so that thermal shock does not occur.

Controllers for Electrochromic Devices

As explained, a switchable optical device will have an associated controller, e.g. a microprocessor that controls and manages the device depending on the input. It is designed or configured (e.g., programmed) to implement a control algorithm of the types described above. In various embodiments, the controller receives detected information about a window's condition including, for example, illumination level, temperature, temperature gradient (spatial and/or temporal), transmissivity, and/or state of tint, as appropriate. Further, the controller may have various additional features such as timers, charge detectors (e.g., coulomb counters), oscillators, and the like.

In one embodiment, the window controller is a multipurpose controller, that is, it can control and/or monitor a number of functions and/or characteristics of one or more tintable windows. Various arrangements of multipurpose controllers are presented in U.S. patent application Ser. No. 13/049,756, filed Mar. 16, 2011, naming Brown et al. as inventors, titled "MULTIPURPOSE CONTROLLER FOR MULTISTATE WINDOWS," which is hereby incorporated by reference in its entirety. In certain embodiments, the controller provides at least the following functions: (1) determining when a potentially damaging thermal shock inducing trigger condition is occurring or is about to occur in a window, (2) providing power to the window to control its level of tint, and (3) controlling the level of transmissivity in the window. In some embodiments, the controller may additionally include functionality for heating the window. In certain embodiments, the controller can also determine when the window is broken, as caused by thermal shock or some other condition.

In some embodiments, the controller is located external to the device and communicates with the device via a network. The communication can be direct or indirect (e.g., via an intermediate node between a master controller and the device). The communication may be made via a wired or wireless connection.

In some embodiments, the controller is integrated with the optical device or housing. In a specific embodiment, the controller is integrated in the housing or a seal of an insulated glass unit (IGU) containing a switchable optical device. Various arrangements of integrated controllers are presented in U.S. Pat. No. 8,213,074, filed Mar. 16, 2011, naming Shrivastava et al. as inventors, titled "ONBOARD CONTROLLER FOR MULTISTATE WINDOWS," which is hereby incorporated by reference in its entirety.

Figure 2:
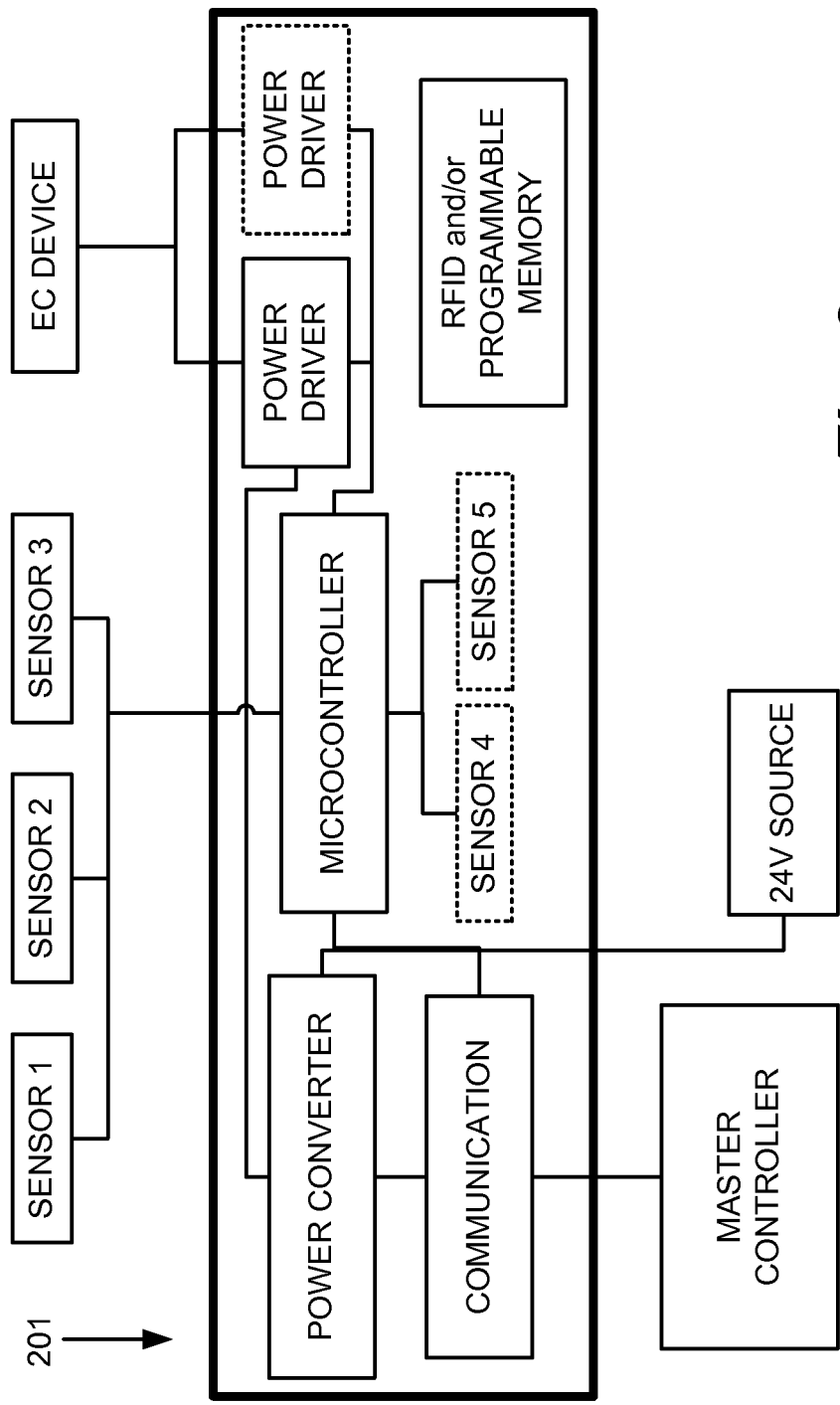
FIG. 2 is a schematic illustration of a controller that may be used to control switchable optical devices according to the methods described herein.

In one embodiment, a controller contains various components as depicted in FIG. 2. As shown, the controller 201 includes a power converter configured to convert a low voltage to the power requirements of an electrochromic device of an electrochromic pane of an IGU. This power is typically fed to the electrochromic device via a driver circuit (power driver). In the illustrated embodiment, the controller 201 has an optional (indicated here by dotted line) redundant power driver so that in the event one fails, there is a backup and the controller 201 need not be replaced or repaired. Other embodiments may not have a redundant power driver.

Controller 201 also includes a communication circuit (labeled "communication" in FIG. 2) for receiving and sending commands to and from a remote controller (depicted in FIG. 2 as "master controller"). The communication circuit also serves to receive and send input to and from a microcontroller. In one embodiment, the power lines are also used to send and receive communications, for example, via protocols such as Ethernet. The microcontroller includes a logic for controlling the at least one electrochromic pane based, at least in part, by input received from one or more sensors. In this example sensors 1-3 are, for example, external to controller 201, located for example in the window frame or proximate the window frame. In one embodiment, the controller has at least one or more internal sensors. For example, controller 201 may also or alternatively have "onboard" sensors 4 and 5. In one embodiment, the controller uses the switchable optical device as a sensor, for example, by using current-voltage (IN) data obtained from sending one or more electrical pulses through the electrochromic device and analyzing the feedback.

In one embodiment, the controller includes a chip, a card or a board which includes logic for performing one or more control functions. Power and communication functions of controller 201 may be combined in a single chip, for example, a programmable logic device (PLD) chip, field programmable gate array (FPGA) and the like. Such integrated circuits can combine logic, control and power functions in a single programmable chip. In one embodiment, where the electrochromic window (or IGU) has two electrochromic panes, the logic is configured to independently control each of the two electrochromic panes. In one embodiment, the function of each of the two electrochromic panes is controlled in a synergistic fashion, that is, so that each device is controlled in order to complement the other. For example, the desired level of light transmission, thermal insulative effect, and/or other property are controlled via combination of states for each of the individual devices. For example, one electrochromic device may be placed in a colored state while the other is used for resistive heating, for example, via a transparent electrode of the device. In another example, the optical states of the two electrochromic devices are controlled so that the combined transmissivity is a desired outcome.

Controller 201 may also have wireless capabilities, such as control and powering functions. For example, wireless controls, such as RF and/or IR can be used as well as wireless communication such as Bluetooth, WiFi, Zigbee, EnOcean and the like to send instructions to the microcontroller and for the microcontroller to send data out to, for example, other window controllers and/or a building management system (BMS). Wireless communication can be used in the window controller for at least one of programming and/or operating the electrochromic window, collecting data from the electrochromic window from sensors as well as using the electrochromic window as a relay point for wireless communication. Data collected from electrochromic windows also may include count data such as number of times an electrochromic device has been activated (cycled), efficiency of the electrochromic device over time, and the like.

Window Units Including IGUs

Figure 3:
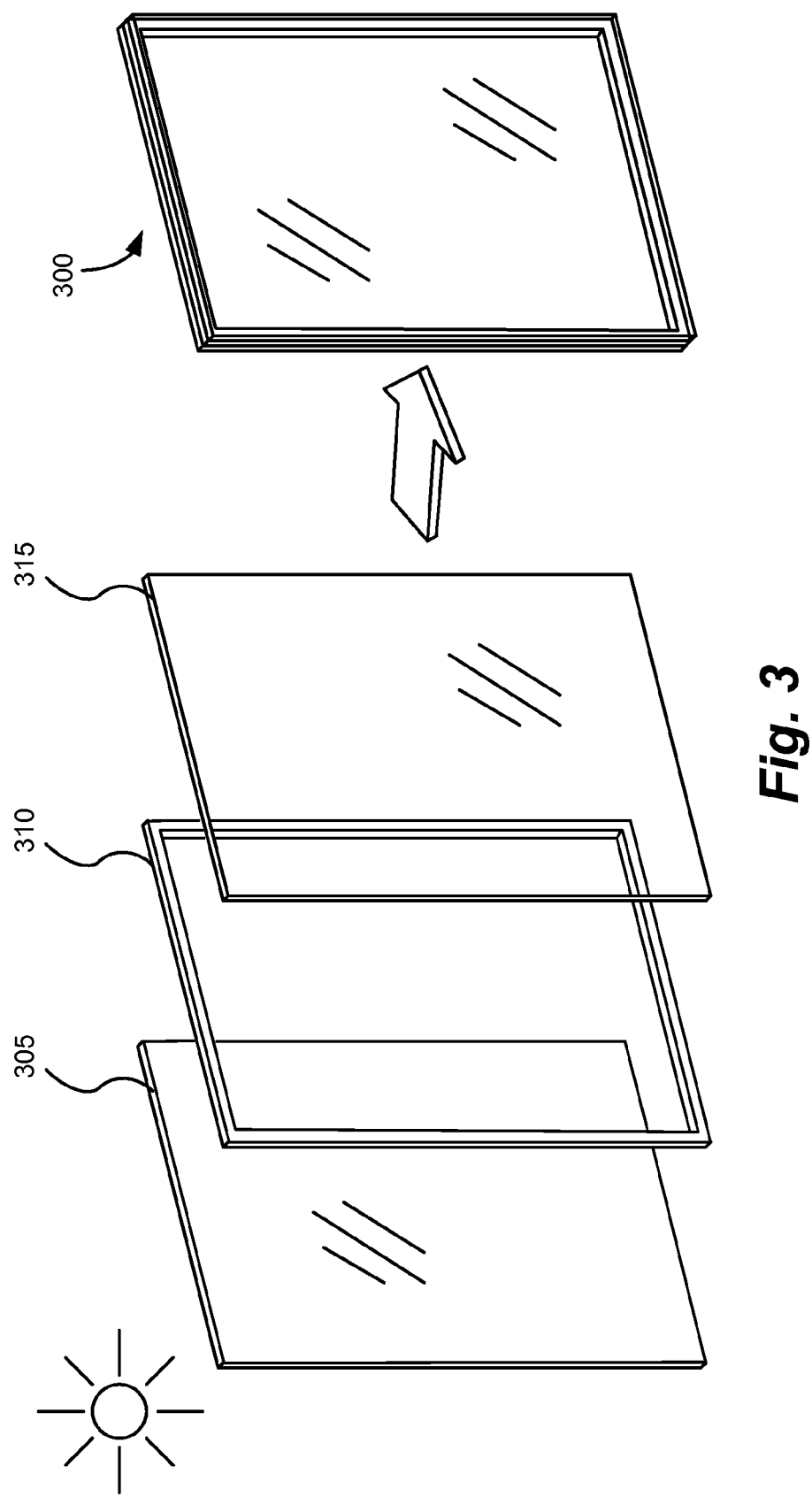
FIG. 3 depicts a perspective exploded view of a multi-pane window assembly.

In various embodiments, the controllers described herein are employed to control the switching of a window pane in an IGU or other multi-pane window unit. As an example, FIG. 3 depicts a window unit 300 having a first pane 305 a separator 310 and a second pane 315. In one example, each of panes 305 and 315 has an electrochromic device (not shown) or other optically switchable device fabricated thereon. In another example, only one of the panes has such switchable device fabricated thereon. When the components are combined, where separator 310 is sandwiched in between and registered with panes 305 and 315, window unit 300 is formed. Window unit 300 has an associated interior space defined by the faces of the panes in contact with the separator and the interior surfaces of the separator. Separator 310 is typically a sealing separator, that is, includes a spacer (or frame) and sealant between the spacer and each pane where they adjoin in order to hermetically seal the interior region and thus protect the interior from moisture and the like.

Figure 4:
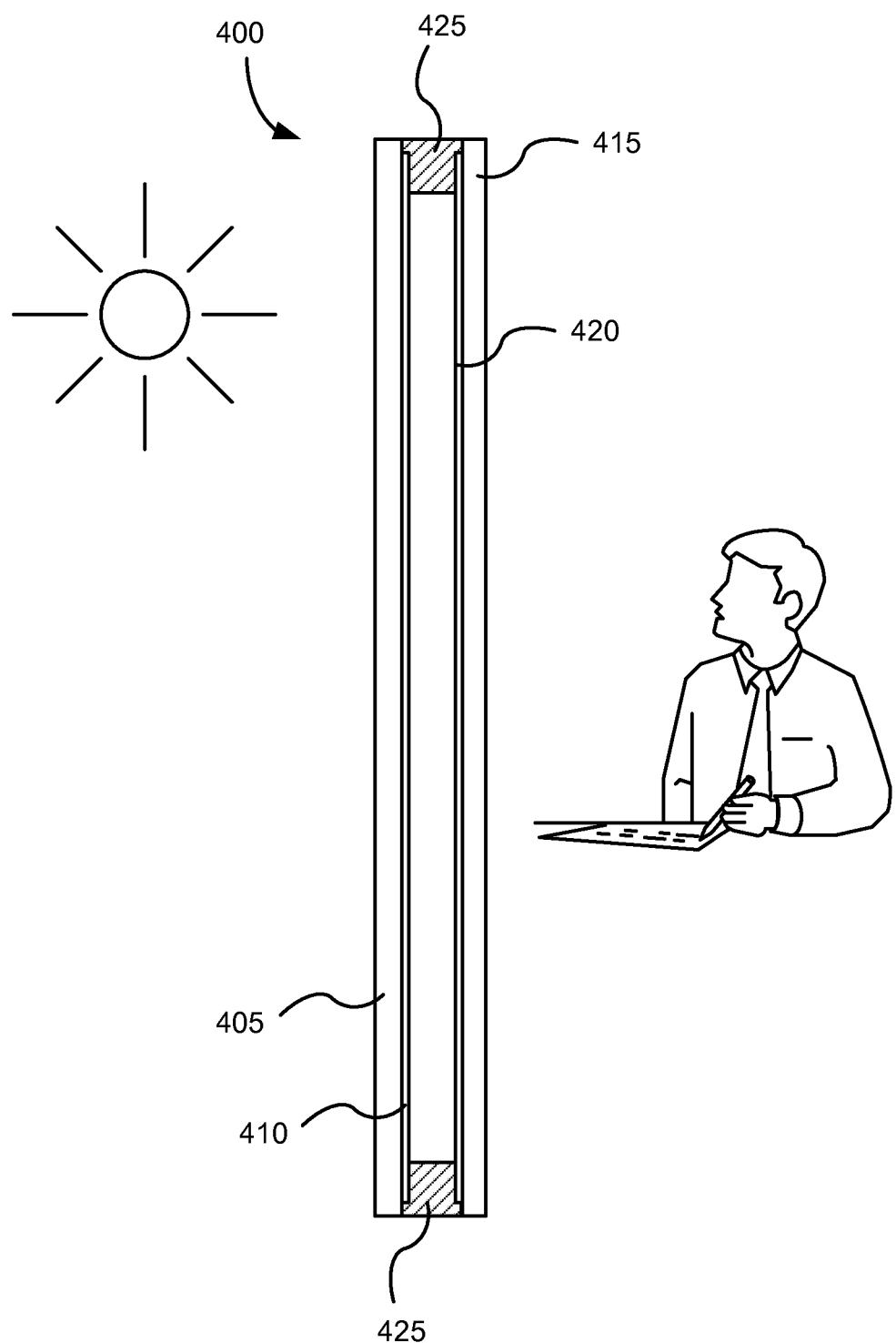
FIG. 4 depicts a cross-section of a multi-pane window assembly.

FIG. 4 depicts a cross-section of a window unit 400 which includes a glass pane 405 with an electrochromic device 410 disposed thereon. Window unit 400 also includes a second glass pane 415 with an electrochromic device 420 disposed thereon. Devices 410 and 420 face each other in the interior region of window unit 400. A sealing separator 425 seals the window unit, and in this example, overlaps the electrochromic devices. Electrical connections (not shown) may pass through, or otherwise contact, separator 425. Separator 425 may have a unitary body or be made of multiple parts, for example, a rigid or semi-rigid spacer and one or more adhesives and/or sealing elements. In one example, separator 425 includes a spacer, such as a metal spacer, two seals that seal the areas where the spacer touches each of the panes, sometimes referred to as primary seals, and a seal around the outer perimeter of the spacer, and between the panes, sometimes called a secondary seal (for example a sealing adhesive). The depiction of separator 425 is simplified for the purposes of the description.

Due to the high temperatures that electrochromic window units may experience (from absorption of radiant energy by electrochromic devices in tinted states), more robust separators and sealants than those used in conventional IGUs may be necessary. An example of separators and sealants used in IGUs can be found in U.S. patent application Ser. No. 61/421,154 filed on Dec. 8, 2012 and titled "IMPROVED SEPARATORS FOR INSULATED GLASS UNITS," which is hereby incorporated by reference in its entirety.

Sealing separator 425 is disposed about peripheral regions of the first and second substantially transparent substrates without substantially obscuring a viewable region of the window unit (also, for example, as depicted in FIG. 3). In one embodiment, the sealing separator hermetically seals the interior region. The interior region of window unit 400 is typically, but not necessarily, charged with an inert gas such as argon or nitrogen. In one embodiment, the interior space is substantially liquid free. In one embodiment, the interior space is charged with an inert gas and substantially liquid free. In one embodiment, the interior space is substantially moisture free, that is, having a moisture content of less than about <0.1 ppm. In another embodiment, the interior space would require at least about −40° C. to reach dew point (condensation of water vapor from the interior space), in another embodiment at least about −70° C.

Thermocouples or other temperature sensing devices may be included in the window unit structure. Optionally, these may be provided in one, two, three or four corners of the window unit. They may be provided inside the frame/spacer and/or in a sealant. In some cases, they are provided on one or both faces of the window unit, so that the temperature differential between the interior and exterior sides of the window unit can be monitored.

The frame spacer can be either thermally insulating or thermally conducting. A typical conducting spacer is made from a metal such as aluminum or steel. A typical insulating spacer is made from foam such as a polymeric material foam. A window pane in contact with a conducting spacer will generally be less susceptible to thermal shock at sunrise (or other rapid increase in impinging thermal radiation) than a pane in contact with an insulating spacer. The conducting spacer will transmit heat from within the building interior relatively fast and so that the outward facing side of the window is relatively warmer prior to the rapid increase in solar radiation. As a consequence, the thermal gradient is much less severe.

Figure 5:
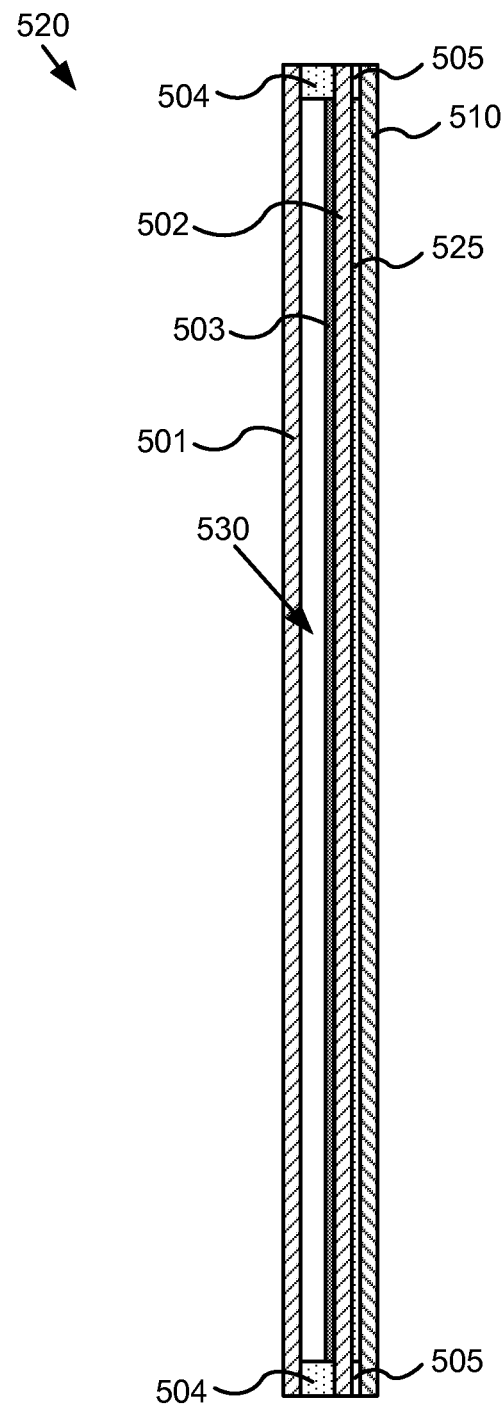
FIG. 5 depicts a cross section of a laminated insulated glass unit (IGU).

FIG. 5 is a cross section showing a window unit 520 having a reinforced electrochromic pane. The window unit includes a first pane 501 and an electrochromic pane 502 which includes an electrochromic device 503 thereon. A reinforcing pane 510 is laminated to electrochromic pane 502 to provide additional strength. Panes 501 and 502 are separated by a sealing separator 504 which spans the perimeter of the panes and has seals between it and each pane. An interior space 530 is defined by the panes 501 and 502 and the sealing separator 504. The electrochromic pane 502 and the reinforcing pane 510 are laminated by a cured resin 525.

In certain embodiments, the glass sheet may be up to 5 mm or even up to 6 mm thick (up to ¼ inch). In some embodiments, one or more panes are strengthened. Optionally, one or both panes of an IGU are strengthened. For example, in one embodiment, strengthening includes laminating one or more of the panes of the IGU with, for example, a thicker pane of float glass, a pane of tempered glass, a polymeric pane such as plexiglass, Gorilla® Glass, and the like. In another embodiment, strengthening includes applying a polymeric coating to one or more panes of the IGU. Examples of such polymeric coatings include ormosil polymeric coatings (epoxy resin, an amine hardener and a silane), sol-gel coatings, acrylic glazes, and other safety glazes, for example commercially available glazes which meet one or more impact test standards.

The substrates of a window unit need not be made of the same material. For example, one pane may be plastic while the other is glass. In addition, one substrate may be thinner than the other substrate in a window unit. For example, the pane that would face the interior of a structure that is not exposed to the environment may be thinner than the pane that would face the exterior of the structure. In one embodiment, when each pane includes an electrochromic device, the electrochromic device proximate the exterior environment, for example of a building, is better able to withstand environmental degradation than the second electrochromic device, which is proximate the interior of the building. In one embodiment, at least one of the first and second panes includes architectural glass. In another embodiment, at least one of the first and second panes further includes a low emissivity coating. In another embodiment, at least one of the first and second panes further includes a UV and/or infrared (IR) absorber, and/or, a UV and/or IR reflective layer.

Electrochromic Devices

As is understood by those of skill in the art, many different types of electrochromic devices exist, each having its own construction, electrode compositions, charge carrier, etc. Any of these devices may be employed in the tintable windows described herein. Certain embodiments employ all solid state and inorganic electrochromic devices. Such all solid-state and inorganic electrochromic devices, and methods of fabricating them, are described in detail in the following U.S. patent applications: patent application Ser. No. 12/645,111 filed on Dec. 22, 2009 and U.S. Pat. No. 8,243,357 issued on May 11, 2011—each titled "FABRICATION OF LOW DEFECTIVITY ELECTROCHROMIC DEVICES," and naming Mark Kozlowski et al. as inventors; U.S. Pat. No. 8,300,298 issued on Apr. 30, 2010 and U.S. Pat. No. 8,228,592 issued on Jun. 22, 2011, each titled "ELECTROCHROMIC DEVICES" and naming Zhongchun Wang et al. as inventors;

Patent application Ser. No. 12/645,159, titled "ELECTROCHROMIC DEVICES," filed on Dec. 22, 2009 and naming Zhongchun Wang et al. as inventors; and patent application Ser. No. 12/772,075 filed on Apr. 30, 2010, and patent application Ser. Nos. 12/814,277 and 12/814,279, each filed on Jun. 11, 2010—each of the latter three applications is titled "ELECTROCHROMIC DEVICES," and each names Zhongchun Wang et al. as inventors. Each of these patent applications and Patents describing electrochromic devices is hereby incorporated by reference in its entirety.

In one embodiment, the electrochromic device is a low-defectivity all solid state and inorganic electrochromic device as described in the above applications. It should be understood, however, that any one or more of the layers in an electrochromic device stack may contain some amount of organic material. The same can be said for liquids that may be present in one or more layers in small amounts. It should also be understood that solid state material may be deposited or otherwise formed by processes employing liquid components such as certain processes employing sol-gels or chemical vapor deposition.

In one embodiment, the electrochromic device is manufactured on the glass sheet in apparatus having a controlled ambient environment, that is, an apparatus in which the layers are deposited without leaving the apparatus and without, for example, breaking vacuum between deposition steps, thereby reducing contaminants and ultimately device performance. This manufacture may include deposition of a diffusion barrier on the glass sheet and the electrochromic device including both electrodes (TCO layers).

Figure 6A:
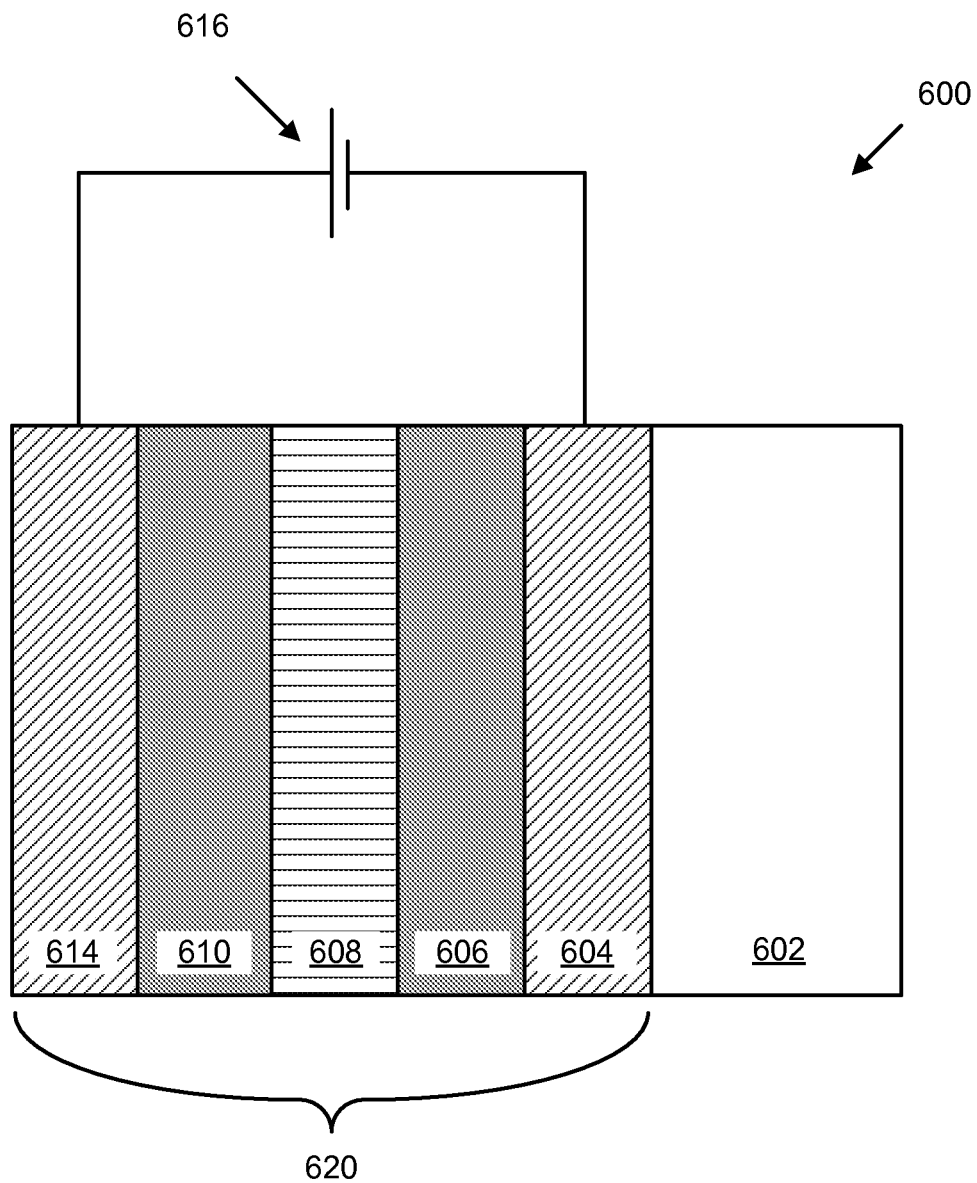
FIG. 6A is a schematic depiction of an electrochromic device in cross-section.

FIG. 6A schematically depicts an electrochromic device 600 in cross-section. Electrochromic device 600 includes a substrate 602, a first conductive layer (CL) 604, an electrochromic layer (EC) 606, an ion conducting layer (IC) 608, a counter electrode layer (CE) 610 and a second conductive layer (CL) 614. Layers 604, 606, 608, 610, and 614 are collectively referred to as an electrochromic stack 620. A voltage source 616 operable to apply an electric potential across electrochromic stack 620 effects the transition of the electrochromic device from, for example, a bleached state to a colored state (depicted). The order of layers can be reversed with respect to the substrate.

It should be understood that the reference to a transition between a bleached state and colored state is non-limiting and suggests only one example, among many, of an electrochromic transition that may be implemented. Unless otherwise specified herein (including the foregoing discussion), whenever reference is made to a bleached-colored transition, the corresponding device or process encompasses other optical state transitions such as non-reflective-reflective, transparent-opaque, etc. Further the term "bleached" refers to an optically neutral state, for example, uncolored, transparent or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In embodiments described herein, the electrochromic device reversibly cycles between a bleached state and a colored state. In some cases, when the device is in a bleached state, a potential is applied to the electrochromic stack 620 such that available ions in the stack reside primarily in the counter electrode 610. When the potential on the electrochromic stack is reversed, the ions are transported across the ion conducting layer 608 to the electrochromic material 606 and cause the material to transition to the colored state.

Referring again to FIG. 6A, voltage source 616 may be configured to operate in conjunction with radiant energy, temperature, and other environmental sensors. As described herein, voltage source 616 interfaces with a device controller (not shown in this figure). Additionally, voltage source 616 may interface with an energy management system that controls the electrochromic device according to various criteria such as the time of year, time of day, and measured environmental conditions. Such an energy management system, in conjunction with large area electrochromic devices (e.g., an electrochromic window), can dramatically lower the energy consumption of a building.

Any material having suitable optical, electrical, thermal, and mechanical properties may be used as substrate 602. Such substrates include, for example, glass, plastic, and mirror materials. Suitable glasses include either clear or tinted soda lime glass, including soda lime float glass. The glass may be tempered, but is untempered in many embodiments.

On top of substrate 602 is conductive layer 604. In certain embodiments, one or both of the conductive layers 604 and 614 is inorganic and/or solid. Conductive layers 604 and 614 may be made from a number of different materials, including conductive oxides, thin metallic coatings, conductive metal nitrides, and composite conductors. Typically, conductive layers 604 and 614 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may also be used.

The function of the conductive layers is to spread an electric potential provided by voltage source 616 over surfaces of the electrochromic stack 620 to interior regions of the stack, with relatively little ohmic potential drop. The electric potential is transferred to the conductive layers though electrical connections to the conductive layers. In some embodiments, bus bars, one in contact with conductive layer 604 and one in contact with conductive layer 614, provide the electric connection between the voltage source 616 and the conductive layers 604 and 614. The conductive layers 604 and 614 may also be connected to the voltage source 616 with other conventional means.

Overlaying conductive layer 604 is electrochromic layer 606. In some embodiments, electrochromic layer 606 is inorganic and/or solid. The electrochromic layer may contain any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. During operation, electrochromic layer 506 transfers ions to and receives ions from counter electrode layer 510 to cause optical transitions.

Generally, the colorization (or change in any optical property—for example, absorbance, reflectance, and transmittance) of the electrochromic material is caused by reversible ion insertion into the material (for example, intercalation) and a corresponding injection of a charge balancing electron. Typically some fraction of the ions responsible for the optical transition is irreversibly bound up in the electrochromic material. Some or all of the irreversibly bound ions are used to compensate "blind charge" in the material. In most electrochromic materials, suitable ions include lithium ions ($Li+$) and hydrogen ions ($H+$) (that is, protons). In some cases, however, other ions will be suitable. In various embodiments, lithium ions are used to produce the electrochromic phenomena. Intercalation of lithium ions into tungsten oxide ($WO_{3-y}$ ($0<y\leq\sim0.3$)) causes the tungsten oxide to change from transparent (bleached state) to blue (colored state).

Referring again to FIG. 6A, in electrochromic stack 620, ion conducting layer 608 is sandwiched between electrochromic layer 606 and counter electrode layer 610. In some embodiments, counter electrode layer 610 is inorganic and/or solid. The counter electrode layer may comprise one or more of a number of different materials that serve as a reservoir of ions when the electrochromic device is in the bleached state. During an electrochromic transition initiated by, for example, application of an appropriate electric potential, the counter electrode layer transfers some or all of the ions it holds to the electrochromic layer, changing the electrochromic layer to the colored state. Concurrently, in the case of NiWO, the counter electrode layer colors with the loss of ions.

In some embodiments, suitable materials for the counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), Prussian blue.

When charge is removed from a counter electrode 610 made of nickel tungsten oxide (that is, ions are transported from the counter electrode 610 to the electrochromic layer 606), the counter electrode layer will transition from a transparent state to a colored state.

In the depicted electrochromic device, between electrochromic layer 606 and counter electrode layer 610, there is the ion conducting layer 608. Ion conducting layer 608 serves as a medium through which ions are transported (in the manner of an electrolyte) when the electrochromic device transitions between the bleached state and the colored state. Preferably, ion conducting layer 608 is highly conductive to the relevant ions for the electrochromic and the counter electrode layers, but has sufficiently low electron conductivity that negligible electron transfer takes place during normal operation. A thin ion conducting layer with high ionic conductivity permits fast ion conduction and hence fast switching for high performance electrochromic devices. In certain embodiments, the ion conducting layer 608 is inorganic and/or solid.

Examples of suitable ion conducting layers (for electrochromic devices having a distinct IC layer) include silicates, silicon oxides, tungsten oxides, tantalum oxides, niobium oxides, and borates. The silicon oxides include silicon-aluminum-oxide. These materials may be doped with different dopants, including lithium. Lithium doped silicon oxides include lithium silicon-aluminum-oxide. In some embodiments, the ion conducting layer comprises a silicate-based structure. In some embodiments, a silicon-aluminum-oxide (SiAlO) is used for the ion conducting layer 608.

The electrochromic device 600 may include one or more additional layers (not shown) such as one or more passive layers. Passive layers used to improve certain optical properties may be included in electrochromic device 600. Passive layers for providing moisture or scratch resistance may also be included in the electrochromic device 600. For example, the conductive layers may be treated with anti-reflective or protective oxide or nitride layers. Other passive layers may serve to hermetically seal the electrochromic device 600.

Figure 6B:
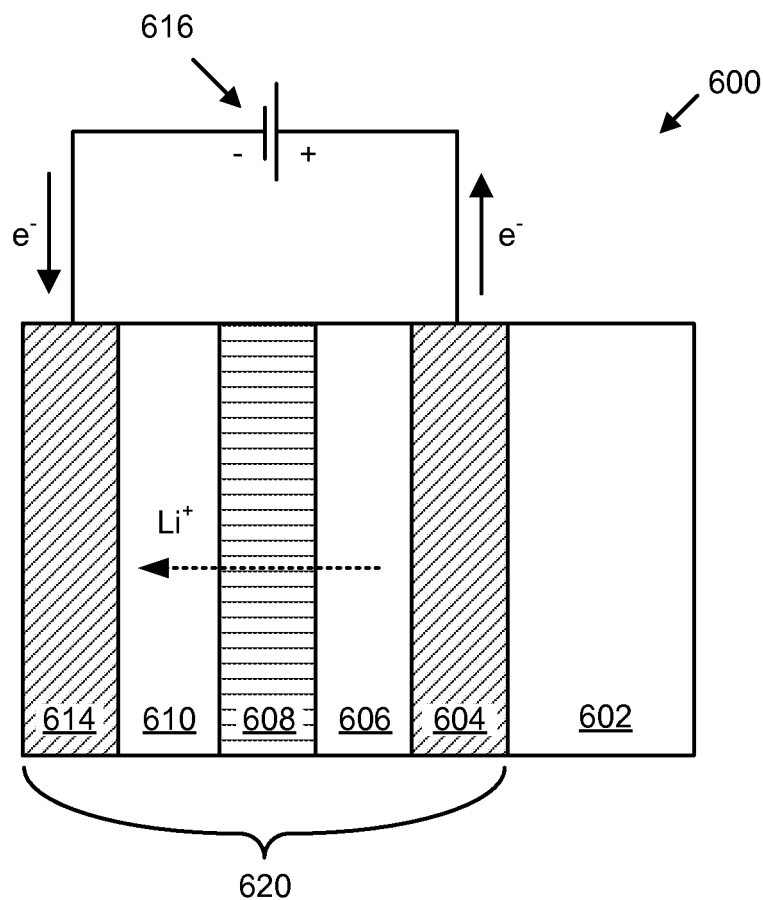
FIG. 6B is a schematic cross-section of an electrochromic device in a bleached state (or transitioning to a bleached state).

FIG. 6B is a schematic cross-section of the electrochromic device in a bleached state (or transitioning to a bleached state). As discussed, the electrochromic device 600 includes a tungsten oxide electrochromic layer (EC) 606 and a nickel-tungsten oxide counter electrode layer (CE) 610. The electrochromic device 600 also includes a substrate 602, conductive layer (CL) 604, ion conducting layer (IC) 608, and conductive layer (CL) 614.

The power source 616 is configured to apply a potential and/or current to the electrochromic stack 620 through bus bars or other connections to conductive layers 604 and 614. In some embodiments, the voltage source is configured to apply a potential of about 2 volts in order to drive a transition of the device from one optical state to another. The polarity of the potential as shown in FIG. 6B is such that the ions (lithium ions in this example) primarily reside (as indicated by the dashed arrow) in nickel-tungsten oxide counter electrode layer 610.

Figure 6C:
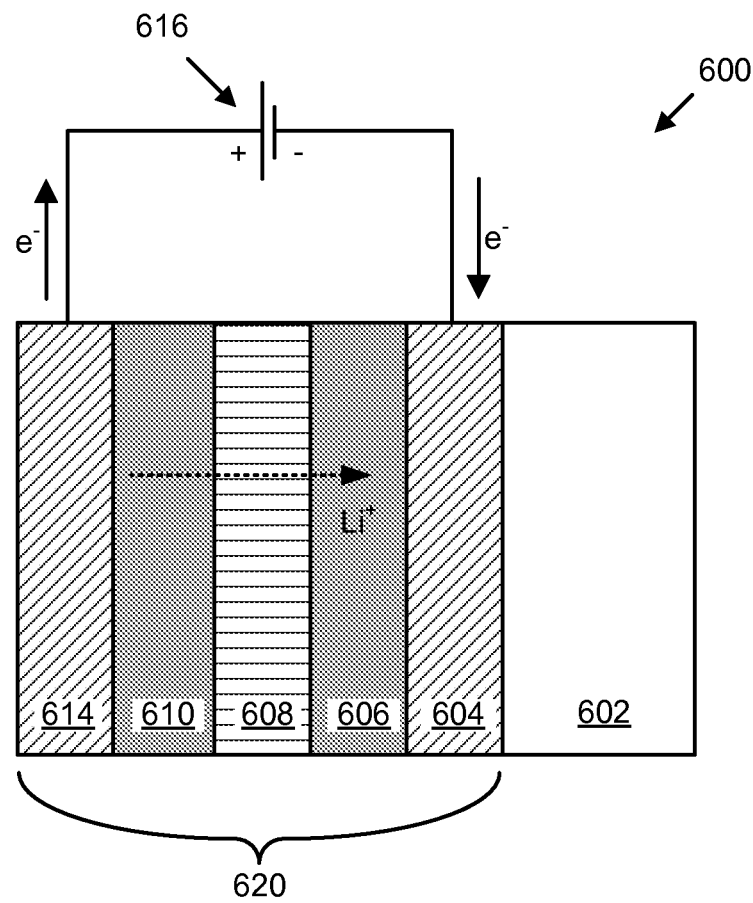
FIG. 6C is a schematic cross-section of electrochromic device shown in FIG. 6B but in a colored state (or transitioning to a colored state).

FIG. 6C is a schematic cross-section of electrochromic device 600 shown in FIGS. 6A and 6B but in a colored state (or transitioning to a colored state). In FIG. 6C, the polarity of voltage source 616 is reversed, so that the electrochromic layer is made more negative to accept additional lithium ions, and thereby transition to the colored state. As indicated by the dashed arrow, lithium ions are transported across the ion conducting layer 608 to the tungsten oxide electrochromic layer 606. The tungsten oxide electrochromic layer 606 is shown in the colored state. The nickel-tungsten oxide counter electrode 610 is also shown in the colored state. As explained, nickel-tungsten oxide becomes progressively more opaque as it gives up (deintercalates) lithium ions. In this example, there is a synergistic effect where the transition to colored states for both layers 606 and 610 are additive toward reducing the amount of light transmitted through the stack and substrate.

As described above, an electrochromic device may include an electrochromic (EC) electrode layer and a counter electrode (CE) layer, separated by an ionically conductive (IC) layer that is highly conductive to ions and highly resistive to electrons. As conventionally understood, the ionically conductive layer therefore prevents shorting between the electrochromic layer and the counter electrode layer. The ionically conductive layer allows the electrochromic and counter electrodes to hold a charge and thereby maintain their bleached or colored states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

In accordance with certain embodiments, the counter electrode and electrochromic electrodes are formed immediately adjacent one another, sometimes in direct contact, without separately depositing an ionically conducting layer. In some embodiments, electrochromic devices having an interfacial region rather than a distinct IC layer are employed with controllers described herein. Such devices, and methods of fabricating them, are described in U.S. Pat. No. 8,300,298 and U.S. patent application Ser. Nos. 12/772,075, 12/814,277, and 12/814,279, each previously incorporated by reference herein.

Figure 7:
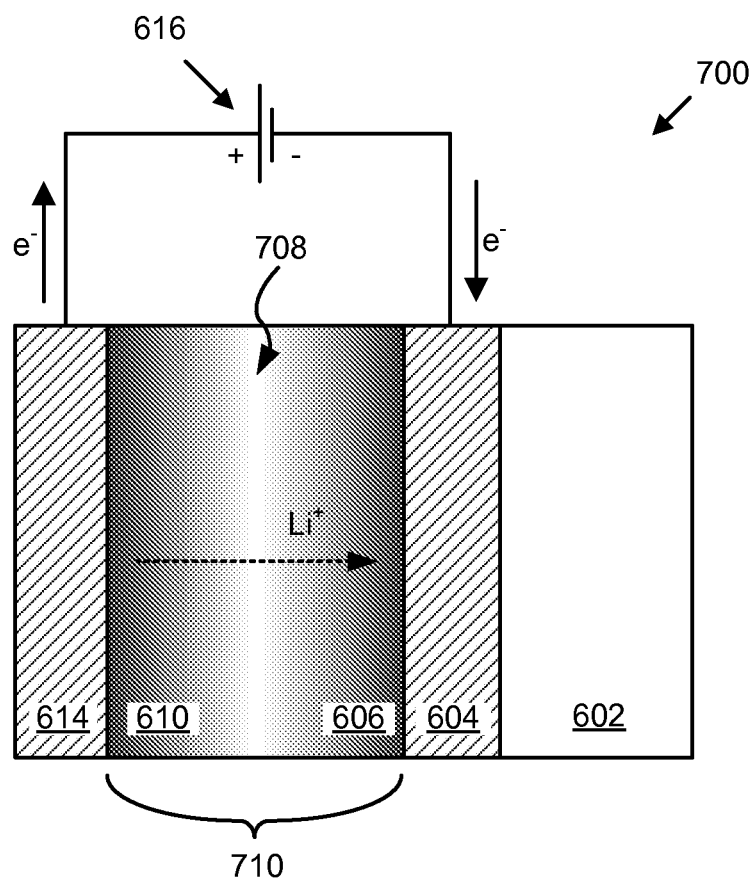
FIG. 7 is a schematic cross-section of an electrochromic device in a colored state, where the device has an interfacial region, which does not contain a distinct ion conductor layer.

FIG. 7 is a schematic cross-section of an electrochromic device 700 in a colored state, where the device has an interfacial region, 708, which does not contain a distinct IC layer. Voltage source 616, conductive layers 614 and 604, and substrate 602 are essentially the same as described in relation to FIGS. 6A-C. Between conductive layers 614 and 604 is a region 710, which includes counter electrode layer 610, electrochromic layer 606 and an "interfacial region" 708, between them, rather than a distinct IC layer. In this example, there is no distinct boundary between counter electrode layer 610 and electrochromic layer 606. Rather, there is a diffuse transition (or no region) between counter electrode layer 610 and electrochromic layer 606.

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

The invention claimed is:

1. A method of reducing a likelihood of thermal shock in a window having one or more panes, the window controllably tintable and in communication with a controller configured to send signals to the window to change tint states, the method comprising:
   determining that a trigger condition likely to induce thermal shock in the window in a first tint state is likely to occur at a particular time, wherein the determination is based on a measured temperature of the one or more panes of the window; and
   in response to the determination, sending a signal from the controller to the window to place the window in a second tint state that reduces the likelihood that the trigger condition induces thermal shock.

2. The method of claim 1, further comprising:
   determining that the trigger condition has passed; and
   placing the window in a tint state other than the second tint state.

3. The method of claim 1, wherein the trigger condition is one of a rapid change in radiation flux striking the window and a rapid change in ambient temperature on an exterior side of the window.

4. The method of claim 1, wherein the trigger condition is one of a plurality of trigger conditions including a rapid change in radiation flux striking the window, a rapid change in ambient temperature on an exterior side of the window, a predefined temperature difference between two corners of the window, a predefined temperature difference between the center and edge of the window, and a pre-determined temperature difference between the environment proximate one face of the window and the environment proximate the other face of the window.

5. The method of claim 1, wherein the particular time is one of at or about sunrise and at or near a predicted change in weather conditions.

6. The method of claim 5, wherein the predicted change in weather conditions includes a transition between cloudy and sunny conditions.

7. The method of claim 1, wherein placing the window in the second tint state comprises placing the window in a state of transmissivity at at least a predefined level of transmissivity wherein the predefined level of transmissivity is 40%.

8. The method of claim 1, further comprising heating at least a portion of the window to further reduce the likelihood that the trigger condition will induce thermal shock.

9. The method of claim 1, wherein the window comprises an electrochromic device.

10. A window and environmental control system for reducing a likelihood of thermal shock in a window having one or more panes, the system comprising:
    a window having a tintable layer; and
    a controller configured to
       determine that a trigger condition likely to induce thermal shock in the window is likely to occur at a particular time, wherein the determination is based on a measured temperature of the one or more panes of the window, and
       place the window in a tint state that reduces the likelihood that the trigger condition will induce thermal shock.

11. The system of claim 10, wherein the window comprises a pane of untempered glass.

12. The system of claim 11, wherein the window is produced by first coating the tintable layer on a glass substrate and then cutting the large format glass substrate to the size of the window.

13. The system of claim 10, wherein the tintable layer is an electrochromic layer.

14. The system of claim 10, wherein the trigger condition is one of a rapid change in radiation flux striking the window and a rapid change in the temperature of the environment on an exterior side of the window.

15. The system of claim 10, wherein the trigger condition is one of a plurality of trigger conditions including a rapid change in radiation flux striking the window, rapid change in ambient temperature on an exterior side of the window, predefined temperature difference between two corners of the window, predefined temperature difference between the center and edge of the window, and pre-determined temperature difference between the environment proximate one face of the window and the environment proximate the other face of the window.

16. The system of claim 10, wherein the particular time is one of at or about sunrise and at or near a predicted change in weather conditions.

17. The system of claim 16, wherein the predicted change in weather conditions includes a transition between cloudy and sunny conditions.

18. The system of claim 10, wherein the controller is configured to place the window in the tint state by placing the window in a state of transmissivity at at least a predefined level of transmissivity wherein the predefined level of transmissivity is 40%.

19. The system of claim 10, further comprising heating at least a portion of the window to further reduce the likelihood that the trigger condition will induce thermal shock.

\* \* \* \* \*